United States Patent
Desmond

(10) Patent No.: US 8,190,293 B2
(45) Date of Patent: *May 29, 2012

(54) ELECTROMAGNETIC COMMUNICATION AND CONNECTION SYSTEM FOR SELF STRUCTURING AND COMPUTING MODULES

(76) Inventor: Neil Desmond, Woodbridge, VA (US)

( * ) Notice: Subject to any disclaimer, the term of this patent is extended or adjusted under 35 U.S.C. 154(b) by 1306 days.

This patent is subject to a terminal disclaimer.

(21) Appl. No.: 11/848,763

(22) Filed: Aug. 31, 2007

(65) Prior Publication Data

US 2007/0293988 A1 Dec. 20, 2007

Related U.S. Application Data

(63) Continuation-in-part of application No. 10/975,405, filed on Oct. 29, 2004, now Pat. No. 7,444,205.

(51) Int. Cl.
*G06F 19/00* (2011.01)
(52) U.S. Cl. .................................................... 700/245
(58) Field of Classification Search ............... 700/4, 19, 700/47, 56, 89, 247–250, 900; 977/700, 977/724, 730, 882, 963; 703/1; 903/46, 903/93, 97, 102, 109.1, 152, 185, 377, 408.1, 903/410; 901/1, 50
See application file for complete search history.

(56) References Cited

U.S. PATENT DOCUMENTS

| | | | |
|---|---|---|---|
| 3,714,817 A * | 2/1973 | Miller | 3/639 |
| 4,032,740 A * | 6/1977 | Mittelmann | 219/667 |
| 4,109,398 A | 8/1978 | Hida | |
| 4,608,525 A | 8/1986 | Mori et al. | |
| 4,697,472 A | 10/1987 | Hiyane | |
| 4,964,062 A | 10/1990 | Ubhayakar et al. | |
| 5,040,626 A | 8/1991 | Paynter | |
| 5,103,403 A | 4/1992 | Ch'Hayder et al. | |
| 5,142,932 A | 9/1992 | Moya et al. | |
| 5,145,130 A | 9/1992 | Purves | |
| 5,241,875 A | 9/1993 | Kochanneck | |
| 5,361,186 A * | 11/1994 | Tanie et al. | 361/191 |
| 5,435,405 A | 7/1995 | Schempf et al. | |
| 5,452,199 A | 9/1995 | Murata | |
| 5,515,934 A | 5/1996 | Davis | |
| 5,523,662 A | 6/1996 | Goldenberg et al. | |
| 5,662,587 A | 9/1997 | Grundfest et al. | |
| 5,672,924 A | 9/1997 | Wallace et al. | |
| 5,764,518 A | 6/1998 | Collins | |

(Continued)

OTHER PUBLICATIONS

Toth-Fejel, "Agents, Assemblers, and ANTS Scheduling Assembly with Market and Biological Software Mechanisms", http://www.foresight.org/Conferences/MNT7/Papers/Toth-Fejel/, 2003.

(Continued)

*Primary Examiner* — Khoi Tran
*Assistant Examiner* — Harry Oh
(74) *Attorney, Agent, or Firm* — Diederiks & Whitelaw PLC

(57) ABSTRACT

An electromagnetic communication and connection system for self structuring and computing modules includes one or more inductors located on a connecting plate of a first module for communicating signals to one or more inductors located on a connecting plate of a second module. A computer processor and algorithm are utilized to calculate the spatial relationship of the two modules, and to facilitate alignment of respective connecting plates to achieve an aligned mechanical contact between the respective connecting plates. Once connected, a permanent or semi-permanent physical connection is maintained between the connecting plates and the modules may communicate with one another.

18 Claims, 16 Drawing Sheets

U.S. PATENT DOCUMENTS

| | | | |
|---|---|---|---|
| 5,988,845 | A | 11/1999 | Murata |
| 6,075,924 | A | 6/2000 | Will |
| 6,084,373 | A | 7/2000 | Goldenberg et al. |
| 6,095,011 | A | 8/2000 | Brogårdh |
| 6,150,738 | A | 11/2000 | Yim |
| 6,157,872 | A | 12/2000 | Michael |
| 6,233,502 | B1 | 5/2001 | Yim |
| 6,233,503 | B1 | 5/2001 | Yim et al. |
| 6,243,622 | B1 | 6/2001 | Yim et al. |
| 6,341,614 | B1 | 1/2002 | Tucker et al. |
| 6,546,315 | B1 | 4/2003 | Michael |
| 6,568,869 | B1 | 5/2003 | Murata |
| 6,575,802 | B2 | 6/2003 | Tin et al. |
| 6,577,923 | B1 * | 6/2003 | White et al. .................. 700/245 |
| 6,636,781 | B1 * | 10/2003 | Shen et al. ................... 700/248 |
| 6,686,717 | B2 | 2/2004 | Khairallah |
| 6,725,128 | B2 * | 4/2004 | Hogg et al. .................. 700/245 |
| 6,786,896 | B1 | 9/2004 | Madhani et al. |
| 2003/0040250 | A1 | 2/2003 | Yin et al. |
| 2003/0097203 | A1 | 5/2003 | Michael |
| 2003/0109958 | A1 * | 6/2003 | Hogg et al. .................. 700/245 |
| 2004/0103738 | A1 | 6/2004 | Gao et al. |

OTHER PUBLICATIONS

Hall, "Utility Fog: The Stuff that Dreams are Made Of", http://discuss.foresight.org/~josh/Ufog.html, 2003.

Author Unknown, "Modular Reconfigurable", http://www2.parc.com/spl/projects/modrobots/, 2003.

* cited by examiner

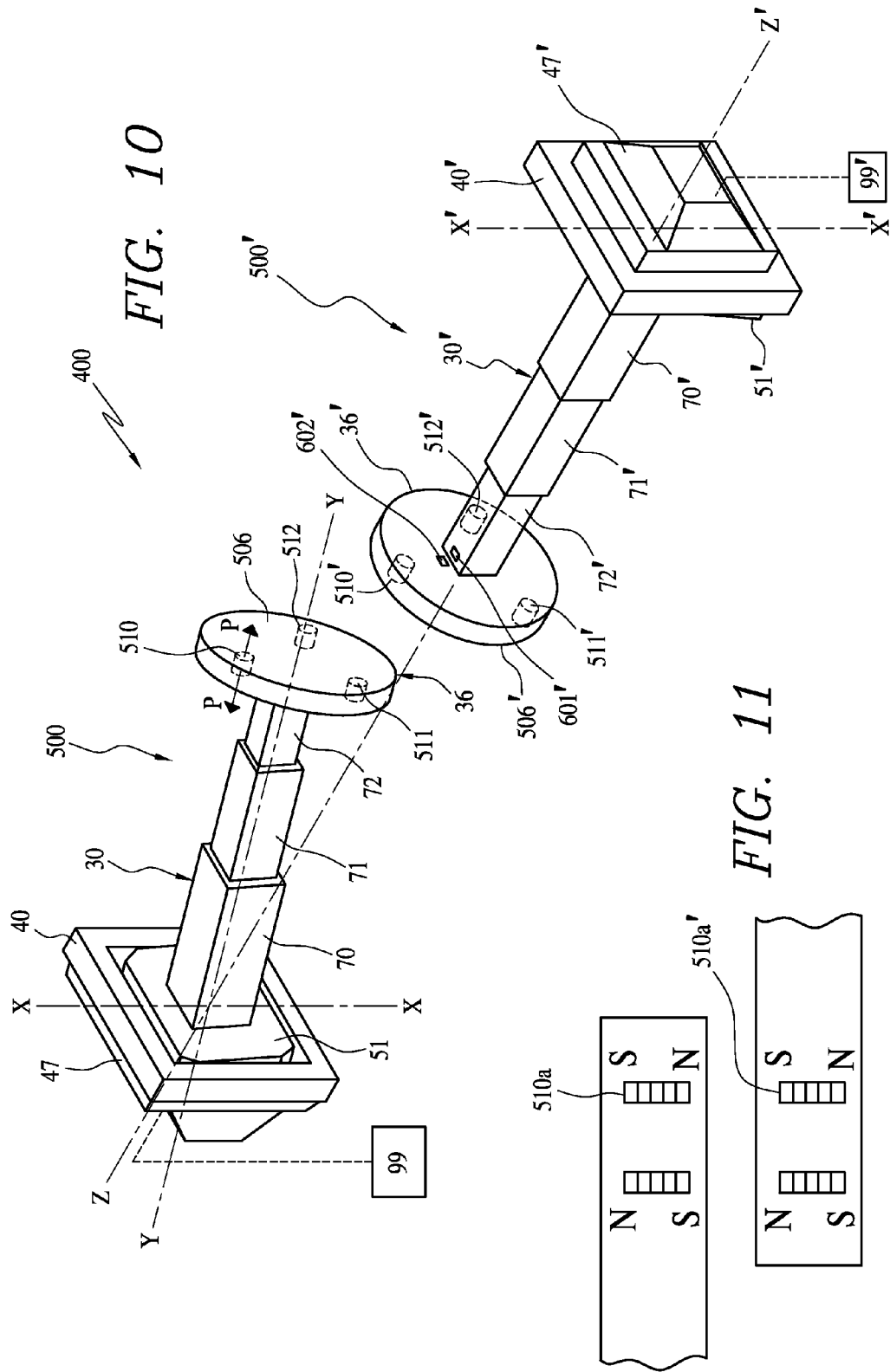

ELECTROMAGNETIC COMMUNICATION AND CONNECTION SYSTEM FOR SELF STRUCTURING AND COMPUTING MODULES

CROSS-REFERENCE TO RELATED APPLICATION

The present application constitutes a continuation-in-part of U.S. patent application Ser. No. 10/975,405, filed Oct. 29, 2004 now U.S. Pat. No. 7,444,405.

BACKGROUND OF THE INVENTION a. Field of the Invention

The present invention is generally directed to an electromagnetic connection and communication system for self structuring and computing modules. More particularly, the invention is directed to numerous modules that may be fit together into a system by electromagnetic connection devices and communication channels, which allow the modules to move relative to one another to form themselves into desired objects or mechanical devices.

b. Discussion of the Prior Art

Currently, in many diverse applications, fields or professions, mechanisms are formed to essentially do one dedicated task. Even those devices which may do multiple tasks are formed with a particular configuration and have very little adaptability to conduct other tasks or change their shape in any meaningful manner. For example, although a computer can be manufactured so that it has certain types of processors, ram, memory or hard drives and further may be programmed to do numerous different tasks, the computer structure itself is essentially static. In other words, if a memory chip needs to be replaced, the box or container for the computer must be opened, the old ram chip or hard drive must be removed and a new chip is placed in the computer.

The structure in typical non-computing devices is even more difficult to change once the devices are manufactured. Objects as simple as forks, knives or spoons or various equipment around the office, such as clipboards and paper clips or even personal use items, such as cameras, eyeglasses, earphones or amusement devices are all pretty much manufactured in their final form. At best, the most adaptable Swiss army knife may have numerous different blades but each blade is cast or manufactured in its final form and simply may be rotated to an operational or non-operational position. For example, the knife cannot become a fork and the fork cannot become a spoon, etc.

On a larger scale, such as, for example, at a manufacturing site, numerous different machines must be used, one for each task. A crane, a forklift and a dump truck all are separately manufactured, have very specific tasks they perform and are brought to a construction site when needed. Recently, some construction equipment has been provided with interchangeable tools. A backhoe may change the tool on its arm from a bucket to a drill, etc. However, even then a selection of different tools must be available.

The equipment on a fire truck provides a good example of how specific tools have become. When firemen on a fire truck arrive at the scene of an accident or fire, they must bring numerous different types of equipment, such as ladders or hoses, axes and the like so that they have the right tool for the right job. Clearly, a reduction in the amount of needed tools would be helpful. Furthermore, the vehicles themselves tend to be very specific. A police car is different from a fire truck which is different from an ambulance, etc. Once again, because once these devices have an essentially static configuration after they are manufactured, any desired modifications to the vehicle must be made in a factory or repair shop.

On a much smaller scale, various parts of tools, such as a knife or parts of a car, such as sensors, indicators, accelerators, brake pedals, transmissions, etc., are all statically formed. At best, for example, a seat in the car might be adjusted forward and back or folded to place the vehicle into a cargo-carrying configuration from a passenger-carrying configuration. However, no fundamental change to structure is designed into these devices. Additionally, although toys are often constructed with moving parts, they do not often have the ability to transform themselves into a variety of completely different objects.

Some solutions have been prepared to address these problems. For example, Utility Fog is a nanotechnology based idea wherein tiny robots form a layer of interrelated units that are connected to one another. The tiny robots can move relative to one another in order to change the shape of an object. For example, they can change the appearance of furniture so that one style of furniture becomes another style. However, currently, Utility Fog falls short on details. For example, Utility Fog, as disclosed, does not have a particularly good mechanism for connecting the various robots or storing energy. Furthermore, manipulating the units relative to one another or developing an effective communication scheme that allows the units to talk to one another has not been developed.

U.S. Pat. No. 5,988,845 discloses a universal unit for automatically configuring three-dimensional structures to desired shapes. This patent is generally directed to three-dimensional structures which may be formed by grouping large numbers of three-dimensional universal units. While this patent does disclose more details regarding the transmission of power from one unit to another and a connecting mechanism, once again, the way these units are connected and move relative to one another are particularly cumbersome and inefficient.

Finally, U.S. Pat. No. 4,608,525 discloses a cellular type robot apparatus. The robot cells are coordinated so that each cell can be controlled so as to operate in concert with one another. Once again, this patent does not disclose a particularly efficient manner of connecting these units or moving them relative to one another.

Regardless of these solutions, we can see that there exists a need in the art for a self-structuring modular system which has an efficient manner of connecting the sub units, providing communication and computing power and allowing the elements to move quickly and rapidly from one position to another relative to each other.

SUMMARY OF THE INVENTION

The present invention is directed to an electromagnetic connection and communication system for self structuring and computing modules. Each module has a set of connecting legs, a set of connecting plates adapted to rotate about their central axis, an internal computer system and an internal power system. Preferably, a center housing is provided with six extending legs having connecting plates on the end of each leg. The housing, or core, supports the legs in a pivotal manner and includes compartments for energy cells and a computer processor. A small amount of memory can be located within the housing or within each set of module legs. Typically, each leg may pivot about two axes and can be extended away from and retracted towards the housing. Various types of actuators may be used to pivot, extend and retract the legs.

Each module includes at least one inductor located on a connecting plate and adapted to communicate with one or more inductors located on a connecting plate of another module. A computer processor and algorithm are utilized to calculate the spatial relationship of the two modules based on electrical signals, and to facilitate alignment of respective connecting plates to achieve an aligned mechanical contact between respective connecting plates. Once connected, a permanent or semi-permanent physical connection is maintained between the connecting plates and the modules may communicate with one another.

Utilizing the communication and connection system of the present invention, one module may connect and thus communicate with another module. Furthermore, groups of modules may be formed into a matrix type structure and by directing various modules to move or pivot their legs, the overall structure can move to change its shape and/or size. Additionally, modules may move from spot to spot by connecting and disconnecting legs in an orderly fashion. For example, a single module at a time may be moved from one end of the overall matrix to another, thus moving the overall matrix in a slow and orderly fashion. Furthermore, one set of modules may be programmed to move relative to another set to cause linear or rotational motion. Alternatively, a plurality of modules may be added to a matrix and then moved to an appropriate position, resulting in a matrix that has a desired shape and size.

Additional objects, features and advantages of the present invention will become more readily apparent from the following detailed description of a preferred embodiment when taken in conjunction with the drawings wherein like reference numerals refer to corresponding parts in the several views.

BRIEF DESCRIPTION OF THE DRAWINGS

FIG. 10 shows a perspective view of two cells utilized in the electromagnetic communication and connection system of the present invention;

FIG. 11 depicts first and second connecting plates, wherein the connecting plates include respective pairs of cylinder shaped inductor cores;

DETAILED DESCRIPTION OF THE PREFERRED EMBODIMENTS

Figure 1:
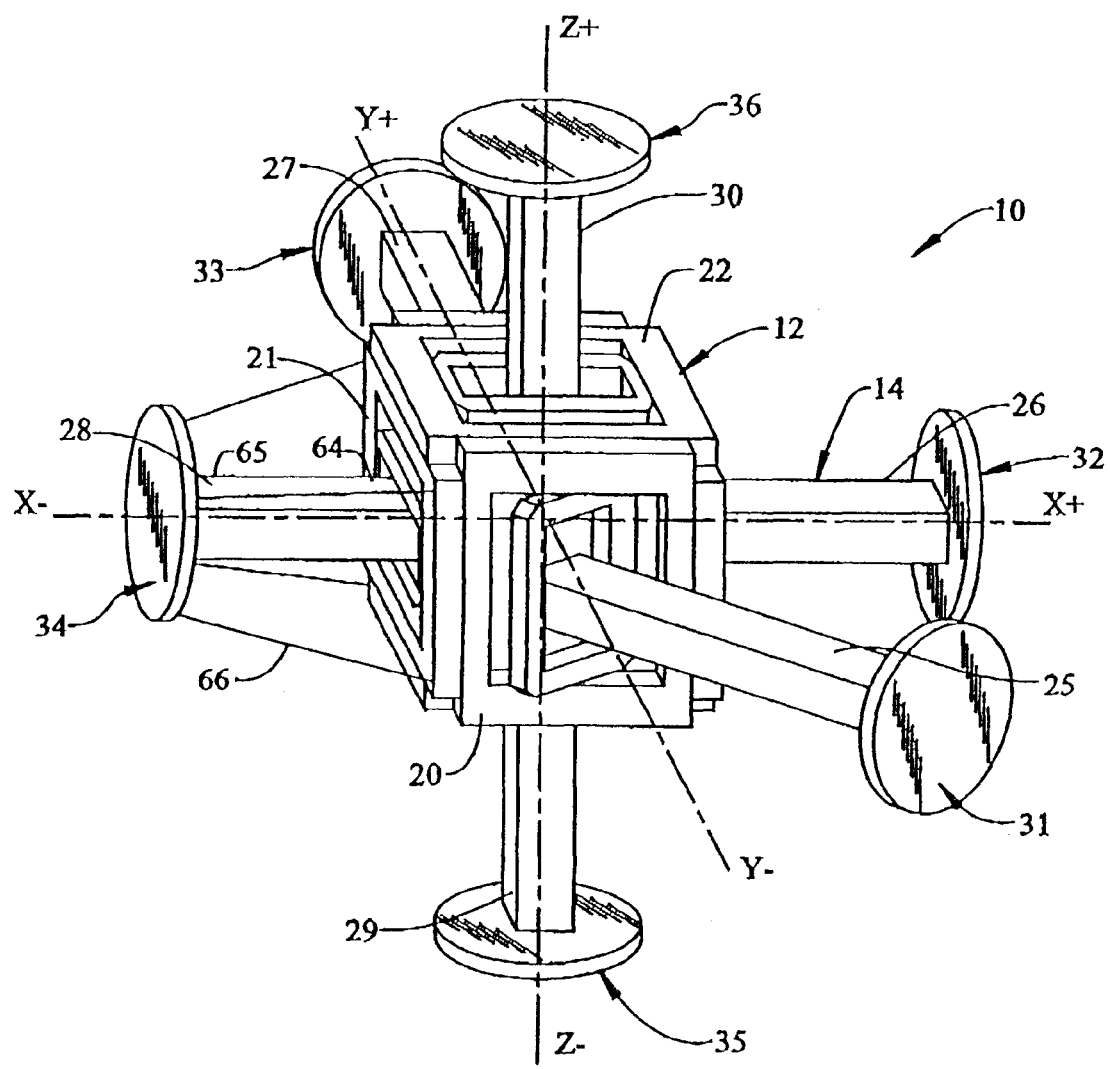
FIG. 1 is a perspective view of a self-structuring computing system utilized in the invention.

With initial reference to FIG. 1, there is shown a single module 10 according to a preferred embodiment of the invention. Module 10 is preferably formed of two major components, a housing 12 and a set of legs 14. Housing 12 is shown as a cube but could be formed in other shapes, such as a sphere. In its cubic form, housing 12 has six faces. Only a front face 20, a left side face 21 and a top face 22 are shown. Each face provides a mounting area for a respective legs 25, 26, 27, 28, 29 and 30 providing housing 12 with six legs. Legs 14 could also, if desired, be placed at each corner (not separately labeled) of housing 12 resulting in module 10 having eight legs. Legs 14 could also be placed both at each surface and each corner resulting in housing 12 having fourteen legs. Of course, any intermediate number of legs is also possible. In a preferred embodiment, housing 12 supports legs 25-30 in a pivotal manner. Each leg 25-30 is provided with a respective connecting plate 31-36. Module 10 is preferably symmetrical about all three axes and numerous modules 10 may be connected to each other by attaching respective connecting plates 31-36 to form a matrix. The lowermost modules 10 may use their connecting plates 31-36 as feet to support the matrix.

Figure 2:
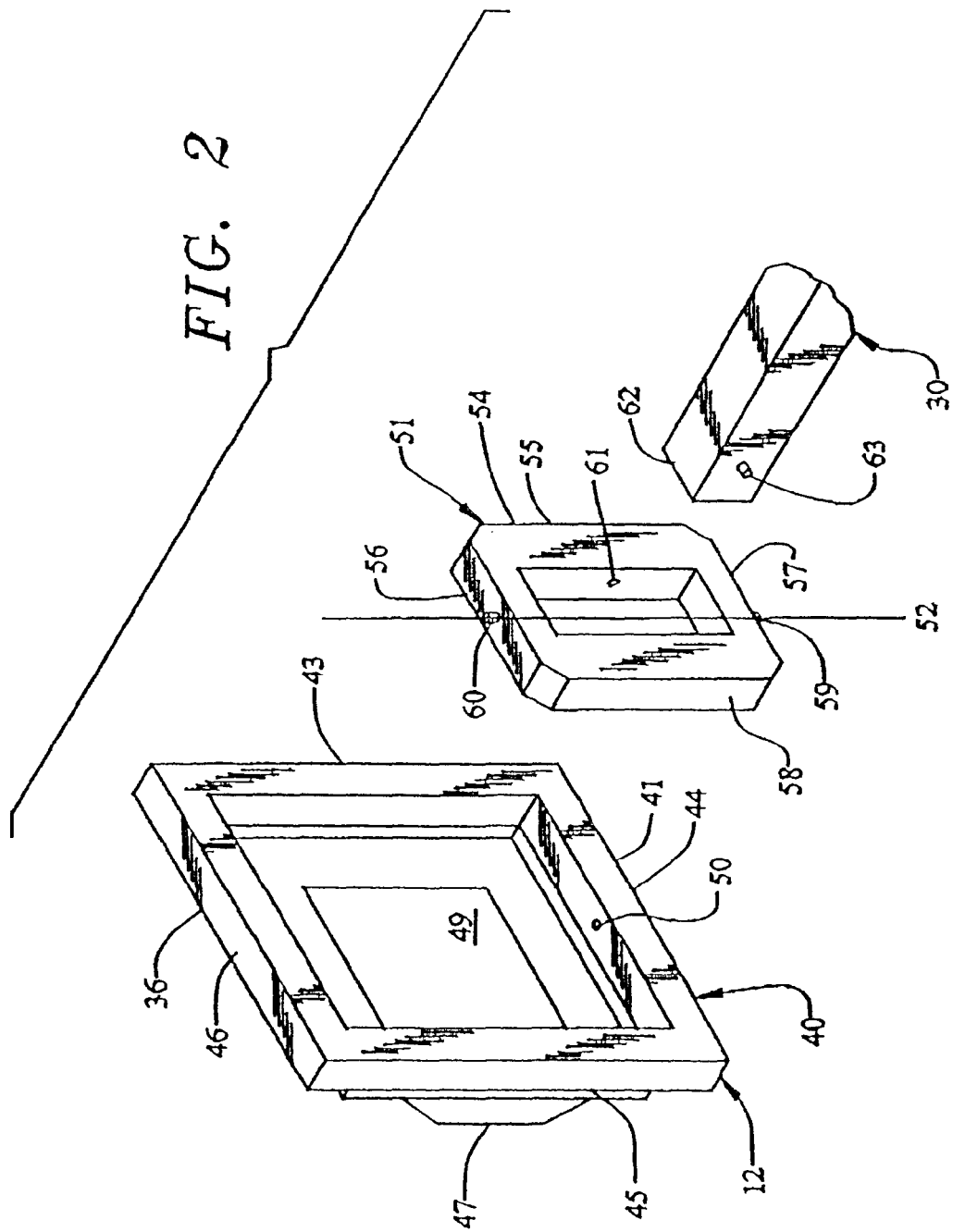
FIG. 2 is an exploded detail view showing a leg connected to a housing according to FIG. 1.

Turning now to FIG. 2, there is illustrated an exploded view of the connection of one leg 30 to housing 12. As mentioned above, a typical leg, such as leg 30, may pivot in any direction relative to housing 12 due to a connecting assembly 40. Connecting assembly 40 includes a rectangular frame 41 mounted securely in housing 12. Frame 41 includes four beams 43-46 and a curved back wall 47 which define the boundaries of a centrally located recess 49. Oppositely located beams 44 and 46 have mounting holes 50 (only one shown) located symmetrically opposite one another. Curved back wall 47 and frame 41 form recess 49 in which a pivoting assembly 51 is mounted for rotation about a first axis 52. Pivoting assembly 51 includes a rectangular housing 54 formed of four beams 55-58. Two of the beams 56, 57 have outwardly extending pins 59, 60 that generally cooperate with mounting holes 50 in frame 41 to allow for the pivoting motion of pivoting assembly 51. Any sort of bearing may be used to reduce friction in this pivoting connection. The remaining two beams 55, 58 of pivoting assembly 51 include mounting holes 61 (only one shown). An end 62 of leg 30 has outwardly extending mounting pins 63 (only one shown) that generally cooperate with mounting holes 61 in pivoting assembly 51. Once again, any type of anti-friction bearing may be used, as may different types of pivoting connections. For example, a rod could be mounted in housing 54 and extend from one beam 55 to another 58 though leg 30 to form the pivoting connection. If leg 30 is restricted to pivot about only one axis, then the adjacent legs should be set up to pivot about axes that are at right angles to one another so as to avoid interference with the other pivoting legs.

As seen in FIG. 1, with specific reference to a different leg 28, one end 64 of leg 28 is attached to housing 12 as discussed above in regards to leg 30. The other end 65 of leg 28 is attached to a connecting plate 34. Legs 25-30 may be free standing or may be reinforced by tension cables 66, seen in FIG. 1, as extending from housing 12 to the edge of connecting plate 34 of leg 28. Cables 66 may be reeled in and out as necessary when leg 28 is extended, retracted or pivoted. When utilized, cables 66 will give the legs 25-30 a more ridged and stable support. The legs 25-30 themselves may be extended and retracted as desired by the use of extendable housing and motive systems.

Figure 3:
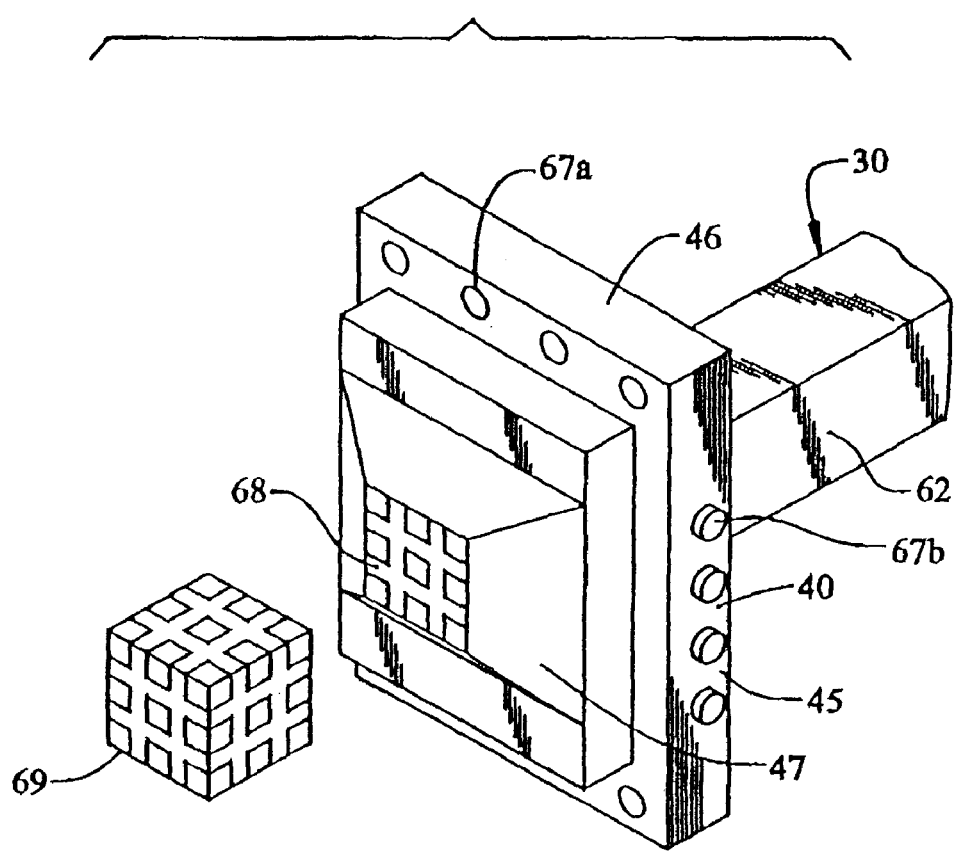
FIG. 3 shows a detail of a pivoting leg along with a battery power source.

Turning now to FIG. 3, there is shown one leg 30 pivotably mounted within its associated connecting assembly 40. Assembly 40 has a series of holes 67*a* mounted in a beam 46 and a series of pins 67*b* extending from beam 45. When six legs are connected to form a module 10, the pins 67*b* from one assembly 40 are inserted into respective holes (not shown) in an adjacent assembly (not shown). While shown in FIG. 3 as one series of holes 67*a* and one series of pins 67*b*, it should be noted that a combination of pins and holes could exist on each beam so long as the mating connector was matched so that a pin would line up with a hole. Back wall 47 extends to a central connector 68 for attachment to a battery 69. Battery 69 is the central power source for module 10. While battery 69 is rechargeable, it is also easily replaceable should battery 69 become damaged in any way.

Figure 4:
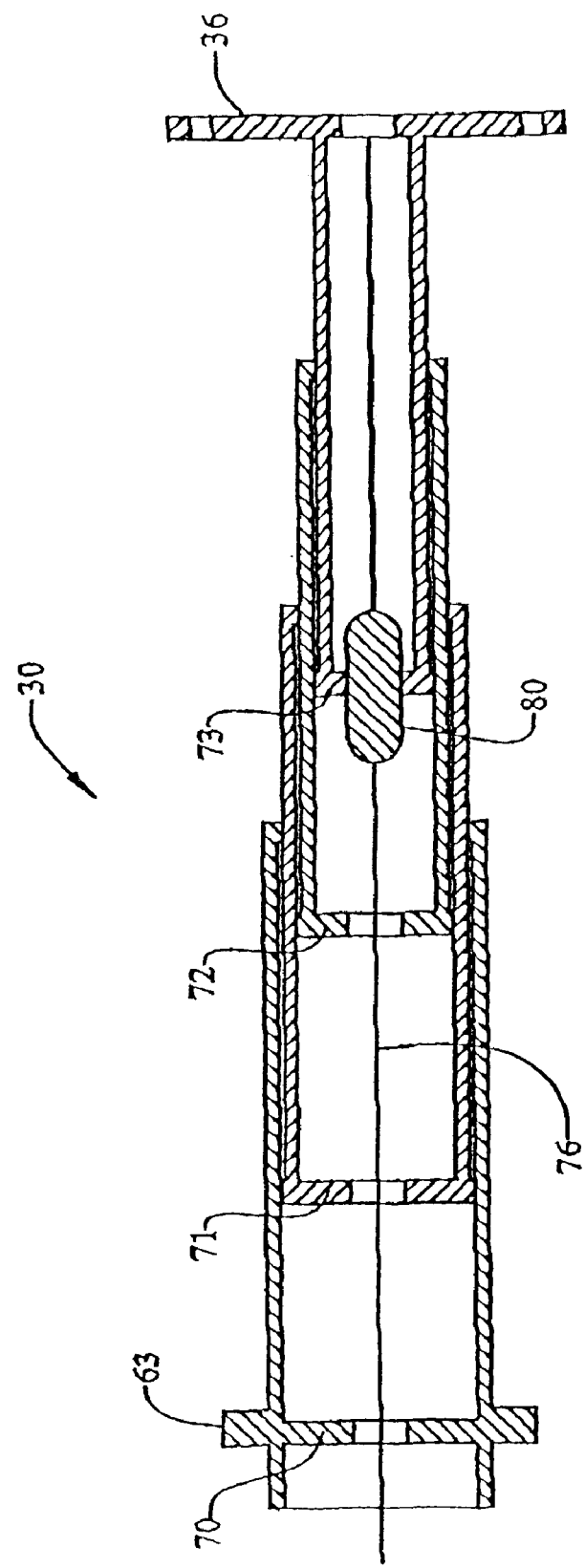
FIG. 4 shows a cross section of a leg along with the leg's internal power and communications cable.

Turning now to FIG. 4, numerous types of extendable beam structures may be used in each leg 25-30. For example, leg 30 includes a series of tubular members 70-73 that may be formed in a telescopic configuration. Of course, the tubular members 70-73 could be in the form of any type of hollow shape, such as a rectangular tube. A largest outer tube 70 includes mounting pins 63 at one end for connecting to housing 12, while a smallest inner tubular member 73 is connected to connecting plate 36. In use, only intermediate tube 71 would be moved in and out if the requirement to extend leg 30 is small and all the tubes 71-73 would be moved relative to one another if a full extension of leg 30 is required. In this manner, the strongest tubes 71 will be used most often and the smaller inner tubes 73 will be used least often.

In order to communicate between different modules, electrical and optical communications are provided between housing 12 and each connecting plate 31-36. For example, wires and optic fibers can be bundled into a cable 76 that may be extended or retracted as leg 30 is extended or retracted. To avoid having cable 76 pinched by sliding tubular members 70-73, cable 76 is protected by a pill type cable support 80. In this arrangement, innermost tubular member 73 of leg 30 is attached to connecting plate 36 at its outermost end and slidably mounted in the next largest tube 72. The next largest tube 71 is open at its outward end so as to receive tube 72. In a similar manner, several outer tubes of progressively larger size and analogous shape may be used, as demonstrated in FIG. 4 by tubular members 70-73. At its inner side, the next largest tube 70 is closed off except for a small central hole 85 for allowing passage of the cable 76. Cable support 80 is provided in the opening of the innermost tube 73. As the tubes 71, 72 and 73 are retracted, the openings in each tube engage cable support 80 which is fixed to the end of innermost tube 73, thus preventing pinching of cable 76. In essence, cable support 80 guides cable 76 through each opening.

Figure 5:
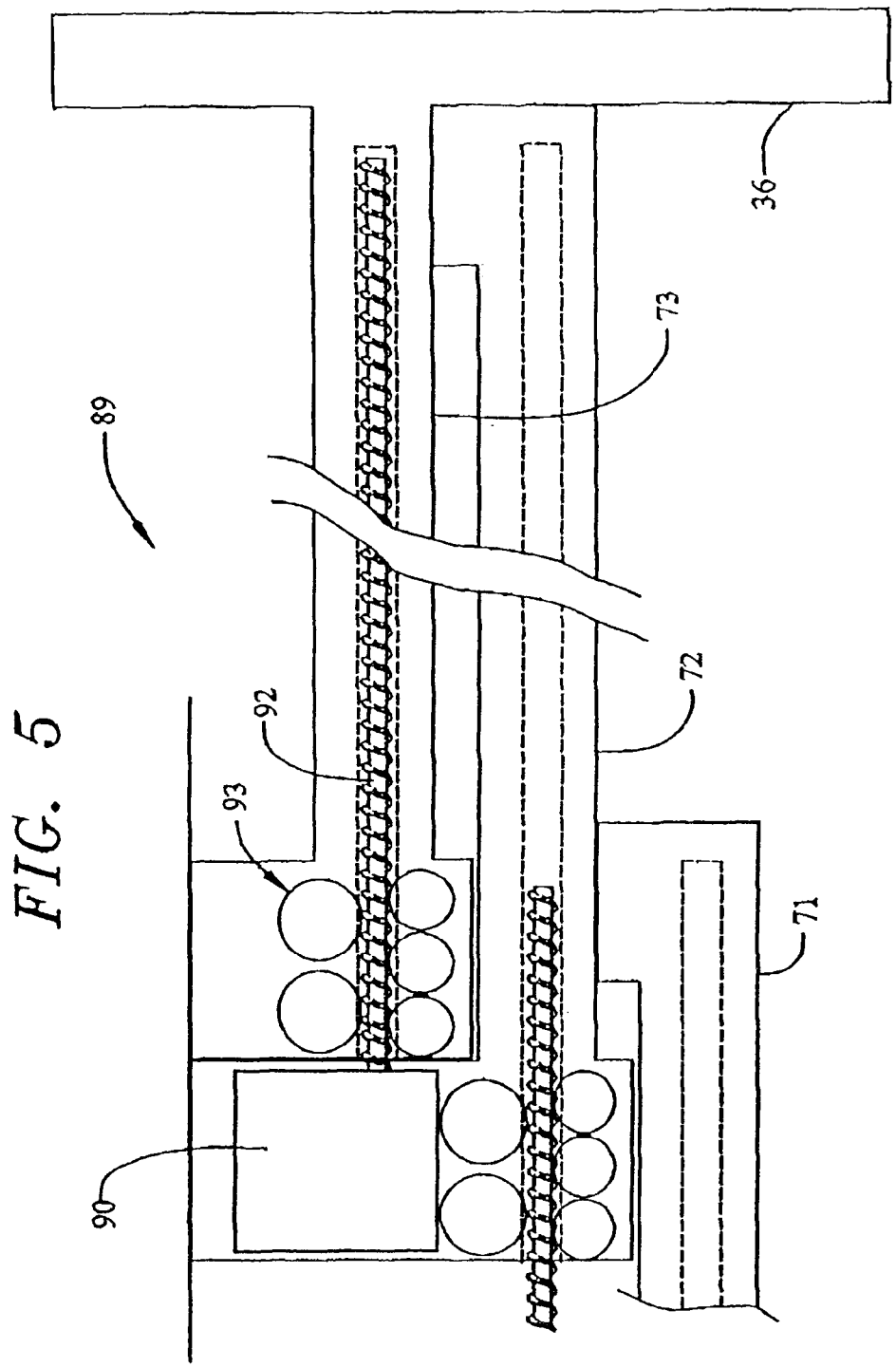
FIG. 5 depicts a drive mechanism for actuating one of the legs of the housing in FIG. 1.

As shown in FIG. 5, the propulsion of the various tubes 70-73 is by a series of screw-nut actuators 89 driven by a series of motors 90 (only one of each shown). In one embodiment, each tube 70-73 includes several series motors 90. An inner set of motors 90 each drive a respective threaded shaft 92. A nut is formed to receive the shaft 92 so that when the shaft 92 rotates, tube 73 will move axially and thus the overall leg 30 extends. The nut may be a traditional, internally-thread member or may be formed from rotating gears 93. When gears 93 are present, they provide an override feature. In a traditional screw nut linear actuator, forcibly moving the linear threaded member will break the actuator. In the current design, when excessive force is placed on the threaded member 92, the gears 93 will rotate, allowing compression of the overall leg 30. The force necessary to cause such an override situation may be adjusted as needed.

Several different additional types of linear actuators (not shown) may be used to extend and retract each leg. While a screw nut type of actuator is depicted in FIG. 5, it is envisioned that an alternative actuator in the form of a series of magnets placed along the length of the tubes 71-73 may be used. Inductors placed among the series of magnets could be controlled by a computing mechanism each or a central processing unit 99. By selectively activating certain magnets, the amount of distance the tubes 71-73 move relative to one another is controlled. Any inexpensive and efficient power source can be utilized such as battery 69. Power is then transmitted from the actuator to leg 30 by a variety of mechanisms. A so-called "lazy tong" mechanism or folding lattice, such as that found in a child safety gate, may also be used. One end of a folding lattice may be attached to the pivoting base tube 70 of the leg 30 and the other end attached to the connecting plate 36. As the first set of scissor legs are brought together by the actuators mounted in the leg base tube 70, the entire lattice structure extends, thus extending the leg 30. This expanding lattice would be placed within the telescoping tubular members 70-73 described above. Another arrangement could include a series of cone shaped members having openings at each end. The cones would be placed in a nested configuration. The cones would include longitudinal openings, which allow a cable to be threaded through. As the cable is pulled taut, the cones are forced to extend. Telescoping tube 70-73, such as that discussed above, could be placed around the cones to provide additional stability. An electric actuator directly built into the telescoping tubes 71-73 could also be used.

The actuators for pivoting the legs 25-30 will have to be powerful to provide enough force to move the matrix. Also, they will have enough force to hold the legs 25-30 at a desired angle once the legs 25-30 have been pivoted. A preferred mechanism for use as such an actuator is a high speed electric motor having a worm gear on its drive shaft. A brake is also provided to stop the motor. The worm gear is connected to a large gear connected to a small circular gear and a small gear drives a rack to provide for translational movement. As such motors and gears are well known in the art, they will not be discussed in detail here.

Figure 6A:
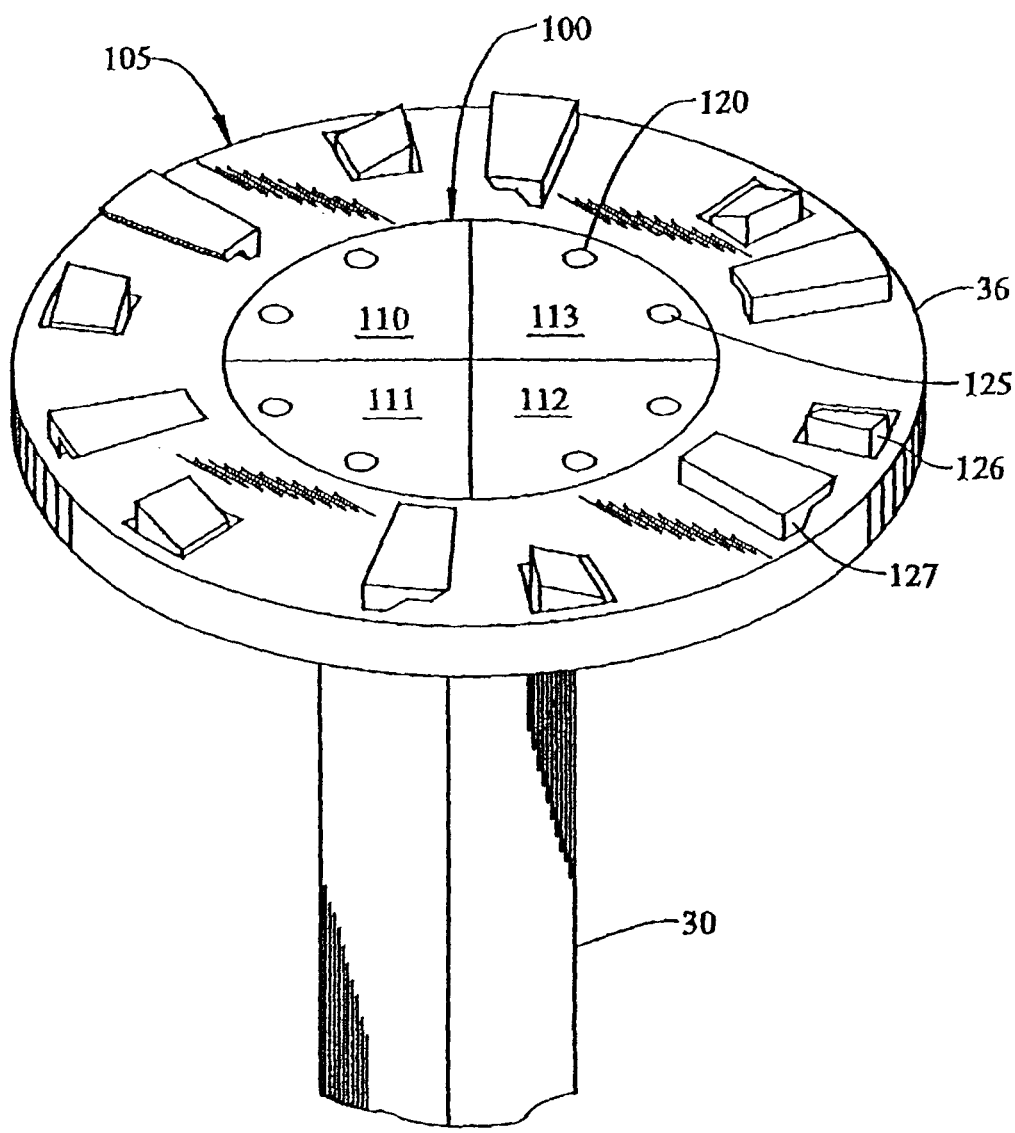
FIG. 6(a) shows a connecting plate of one of the legs of the housing shown in FIG. 1 according to a first preferred embodiment of the invention.
Figure 6B:
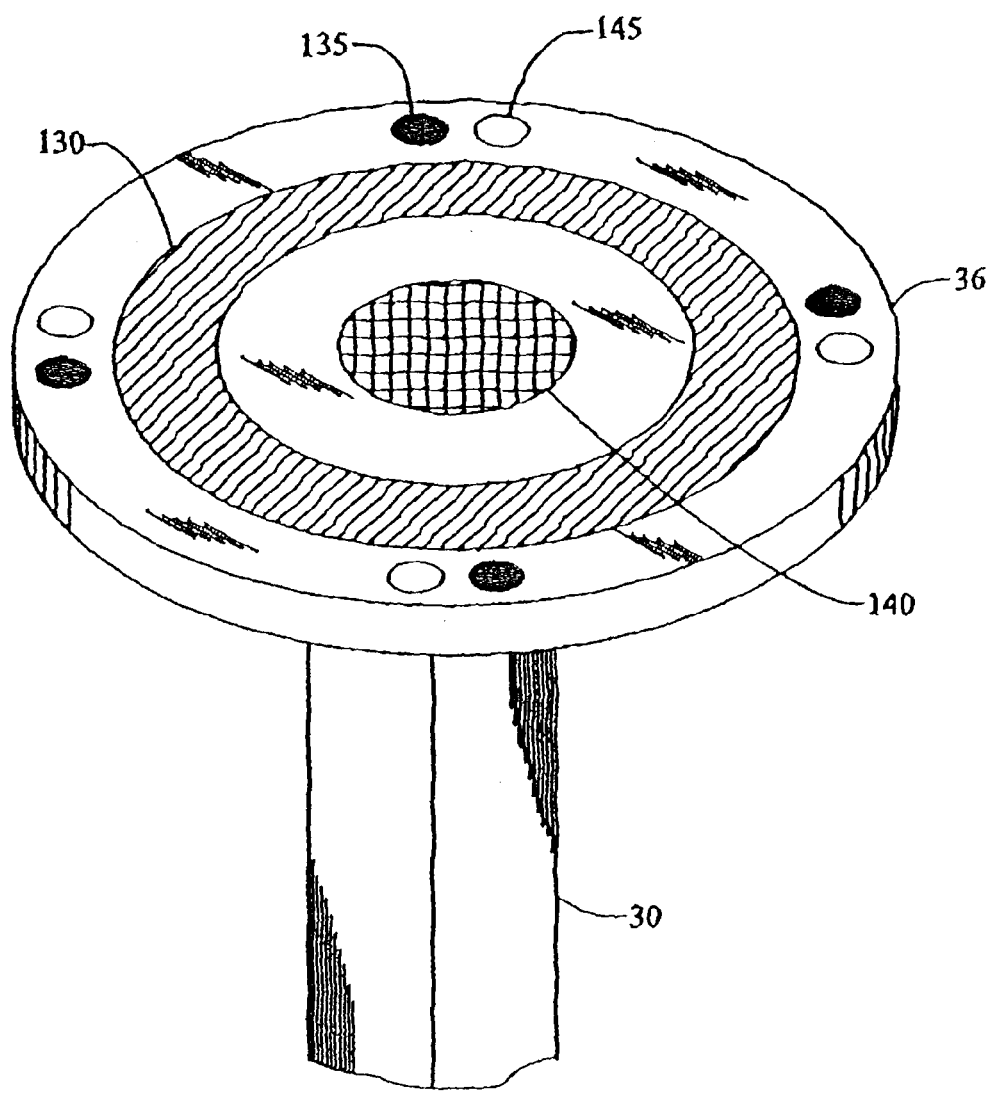
FIG. 6(b) shows a connecting plate of one of the legs of the housing according to a second preferred embodiment of the invention.

Turning now to FIG. 6(*a*), the connecting surfaces or plates 31-36 may be of several designs to provide communication and power transfer between several modular nuclei 12. The connection plate 31 is generally divided into a central area 100 and an outer area 105 that may rotate independently if desired. Central area 100 may be subdivided into four sectors 110-113, with each sector having a power connection 120 and a communications channel 125. The use of four sets of power connections 120 and communication channels 125 allows for redundancy so that if one channel fails the others may take over. Cables 76 are connected to housing 12 at one end and connected to connecting plate 36 at the other end to provide communication between housing 12 and power connection 120 and communication channel 125. In the case of a fixed cable connection between the cable 76 and connecting plate 36, the connecting plate 36 may only rotate a limited amount relative to its tubular support member 74 in order to prevent excess torque of cables 76. Of course, if cables 76 communicate with connecting plate 36 through electrical contact pin connections rather than through a fixed connection, the connecting plate 36 may rotate indefinitely. Connecting plate 36 includes plungers 126 and hooks 127 for providing a relatively long-term mechanical connection between connecting plates as discussed in more detail below in regard to FIGS. 7(*a*)-7(*c*).

FIG. 6(*b*) shows an alternative connection method in which connecting plate 36 is capable of connecting to other module connecting plates using either an electromagnet 130 or connecting clamps and pins 135 for long-term or short-term connections. Additionally, electromagnets 130 could be used to send and receive signals and to transfer power through coupled mutual inductance. In the case that electromagnets 130 transmit signals and power, then a communications region 140 and power conduits may be omitted from connecting surface 36. Although FIG. 6(*b*) depicts the electromagnetic connection in conjunction with mechanical connecting pins 135, it is understood that the various mechanical connection methods can be used interchangeably with various communications methods. An electromagnetic inductor connection and communication method is detailed below and depicted in FIGS. 10-17.

Figure 7A:
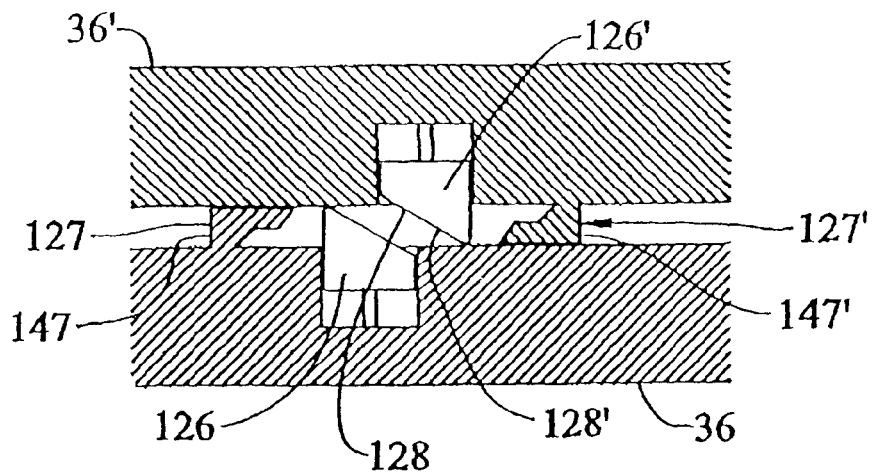
FIGS. 7(a), 7(b) and 7(c) are a series of Figures showing how two different connecting plates engage one another.
Figure 7B:
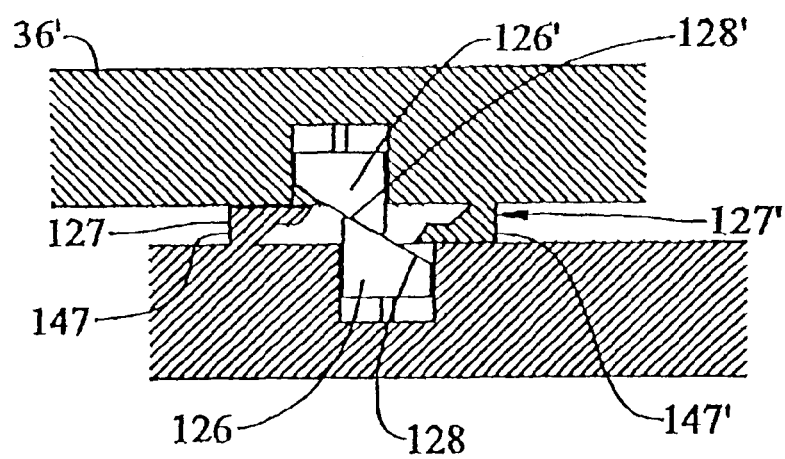
Figure 7C:
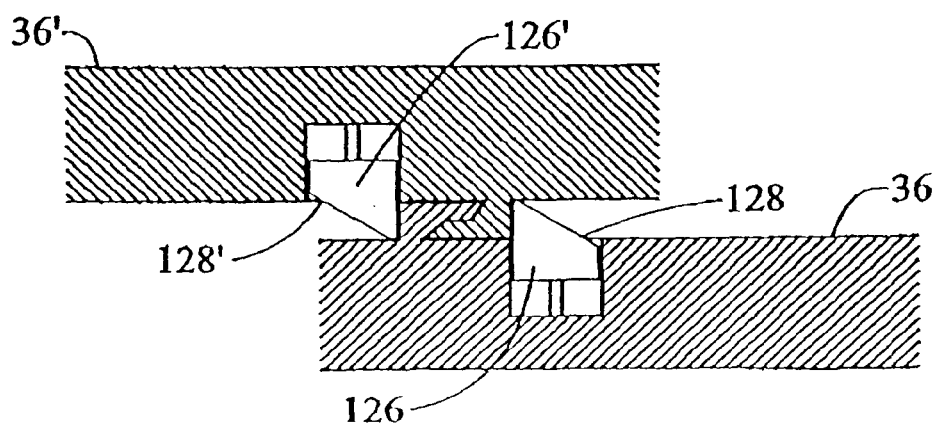

The manner in which the plunger 126 and hook 127 mechanical connection engages is depicted in FIGS. 7(*a*)-7 (*c*). As hooks 127, 127' are rotated into engagement, plungers 126, 126' will retract due to the action of their cooperating sloped top faces 128, 128'. As hooks 127, 127' pass plungers 126, 126' plungers 126, 126' extend and engage the back 147 of hooks 127, locking them in place. The connection can be broken by retracting the plungers 126, 126' and rotating connecting plate 36 in a reverse direction verses connecting plate 36'. Alternate connection mechanisms may also be used. In any case, a releasable strong connection is all that is desired.

Figure 8:
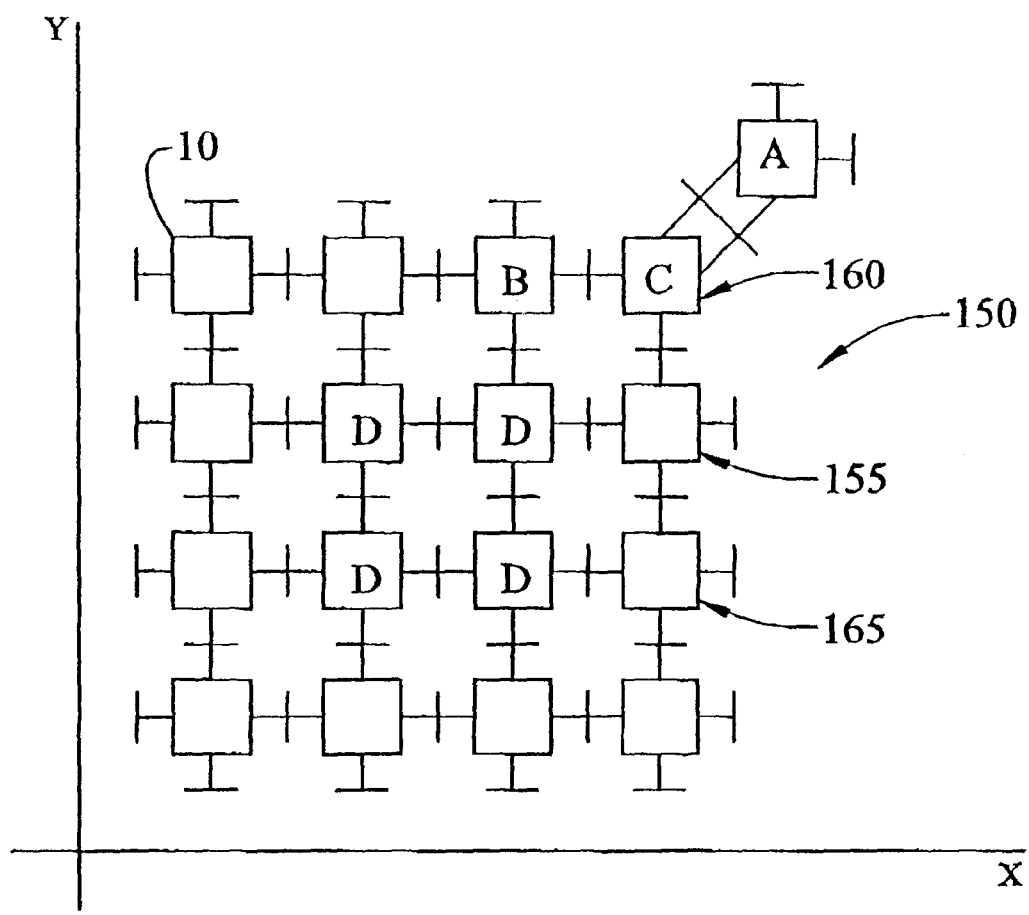
FIG. 8 shows multiple nuclei of a preferred embodiment attached to one another in a matrix.

In operation, as shown in FIG. 8, large groups of modules 12 are assembled together by joining of their connecting plates 36 as discussed above. Once a group of modules is joined into a matrix 150, several options are available as to how the modules will move relative to one another. For example, in two-dimensional matrix 150, the central row 155 of modules may move as a group relative to the outer rows of 160, 165 modules. Central row 155 can then be used to push or pull levers or lift or lower things. If the group moves both in translation and in rotation, the group may act as a leg for overall matrix 150 and provide a way for overall matrix 150 to move. By extension, if various groups are moved and pivoted, an arm and hand (not shown) may be formed which will be able to manipulate objects so that they may be inserted or placed where desired. Additionally, numerous modules 10 may be added to the matrix 150 to increase its overall size.

In addition to moving groups of modules relative to one another, single modules 10 or groups of modules may change position relative to one another to change the overall shape of matrix 150. For example, as seen in FIG. 8, a module A may move from being attached to module B to being attached to module C. This motion may be achieved by spinning module A as it moves from B to C. Module A can also move around a corner of matrix 150 by continuing its rotation and connecting another connecting plate of module C before proceeding down the side of matrix 150. In a similar manner, module A may move along a string of other modules.

One could imagine a building being built by millions of such modules climbing the side of a column and placing themselves at the top of the column to allow yet another layer of modules to climb the side of the column to place a next layer. If the weight of the column is slight, or in the case of a row of modules, a new module can simply replace the position of the first module in the column or row, thus shifting the row or column over one space. This movement achieves the same final configuration more quickly since all the modules are interchangeable.

Rotational motion can also be caused on a large scale. For example, a series of four internal modules D surrounded by a square of twelve modules (not separately labeled) can be used to create such a rotation. Note the modules 10 shown in FIG. 8. The four internal modules D can walk around the inner surface of the outer square thus causing the internal modules D to rotate relative to the outer group. Larger groups of modules could achieve similar motion, wherein for example, a group of nine modules could rotate within a group of fourteen. With even larger groups, the inner groups could be shaped to approximate a circle and the outer groups could be shaped as a ring.

Simply extending or retracting the length of each leg in each module can also accomplish expansion and contraction of an overall matrix 150. Such motion is accomplished without the need for adding or subtracting modules to matrix 150 and may be done in an extremely quick manner. Likewise, if one wishes to expand matrix 150 in only one direction, only legs parallel to that direction would be extended. It is envisioned that numerous combinations or expanding and rotating of strategic parts of matrix 150 would give rise to extremely complicated motions in the overall matrix 150.

Figure 9:
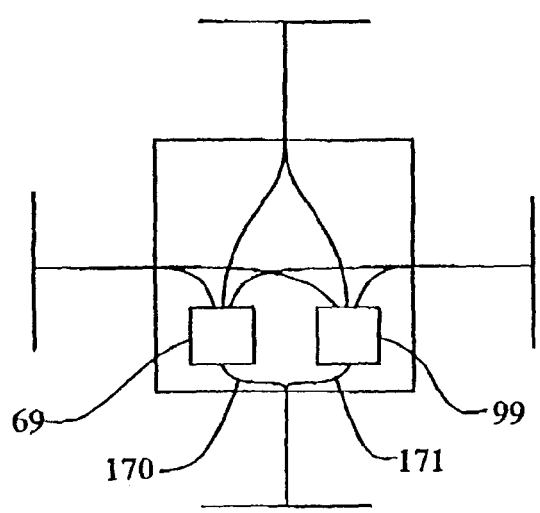
FIG. 9 shows an enlarged view of a nuclei shown in FIG. 8.

The power systems of the matrix 150, as with all systems, begin with a single module 10. As shown in FIG. 9, each module 10 preferably includes at least one battery 69 or other similar power source and at least one central processing unit 99. Wiring 170 is provided so that the power source 69 may connect to all six connecting plates 31-36 and thus connect to every other module in the matrix 150. In a similar manner, the central processing unit 99 is also connected with wiring 171 to every connecting plate 31-36 of the module 10, thus connecting the central processing unit 99 to every other processing unit in matrix 150. Each module can have a small amount of memory (e.g. 100 kilobytes). Alternatively, each set of legs in a module can contain its own small memory source. Every module is designed to have its own individual power supply, however, should one power supply fail, the module with a failed power supply may draw power from adjacent modules. Further, some modules may have their power source removed and still function using power from adjacent modules. Power may also be relayed through a series of modules. Such modules can also act as an electrical power transmission line.

Referring back to FIG. 1, communication between each housing starts with each housing identifying its orientation. There are two ways a module or set of legs can obtain an address: 1) explicitly, wherein the module or leg set stores an identification (ID) value or, 2) implicitly, wherein the collective matrix utilizes techniques such as an algorithm involving having each module relay a data packet and subtracting one from a destination counter. In a first example, the address is explicit and each module has a unique ID value. The value can be fixed and pre-assigned when the module is manufactured. An ID number can also be assigned to each set of legs on a module. A portion of the memory (whether in the core of the module or in the legs) can be used to store the ID number. The ID number can be absolute or relative. An algorithm can be used to extrapolate the address of a particular module using a combination of ID values from several modules in a matrix.

As discussed above, housing 12 can be represented as a cube having six sides. Each side is assigned a number. For example, each even number may be opposite the odd number that proceeds it. So, 2 is opposite 1; 4 is opposite 3 and 6 is opposite 5. Furthermore, the odd numbers are grouped around one corner, the even numbers are grouped around an opposite corner and the even numbers are arranged in an ascending order in a clockwise direction. So, for example, front face 20 may be assigned 1; left side face 21 may be assigned 2, etc. The arrangement of the numbers could also be that of standard left or right-handed dice in which opposite sides add up to seven. The numbers may be pre-assigned or may be assigned when two connecting assemblies are joined based on the pattern. As two connecting assemblies are engaged, their relative orientation can be used to determine which number is assigned to each side of each face of the module. Using a pattern saves times as compared to having to generate a pattern using a random number generator.

In order to arrange a matrix 150, an implicit address method is utilized. Once matrix 150 is formed, the location of each module is assigned an address or value. Instructions for a certain module can be sent to the address of the module. Indeed if a module fails, it can be replaced and the new module can take the failed module's position and address, thus causing minimal disruption by the replacement. The location of each module can be stored as a binary number. For simplicity sake, a three bit number will be used as an example. It should be understood that much larger numbers may be used for large matrixes. The addresses may be pre-assigned and stored in memory or they may be assigned by an algorithm.

Once the addresses are assigned, there are a number of ways that data may be transmitted. In a linear array, a packet of data may include the final address assigned to a counter and subtract one from the counter as it travels to each module. When the packet's counter value equals zero, the packet has arrived at its destination location. For example, a data packet could have a destination address of 011. Since the counter value is not 0, the data packet will move on, subtracting one from the counter, thus having a new counter value of 010. This process is repeated until the data packet has arrived at its destination which is determined by the counter value equaling zero. This system is particularly advantageous in that each module does not need to know its own address. For larger groups, the matrix can be divided into sets of eight with each set being labeled. If data wanted to go to the $3^{rd}$ module in the $5^{th}$ set, an address 5-011 or 101011 in binary could be used and assigned to the counter.

In a two-dimensional array, the address would be given in both directions such that each address would have a six-digit binary-number for each direction. Likewise, in a three-dimensional matrix, three six-digit binary-numbers would be used for a cube having up to 262, 144 modules. Of course, in two and three-dimensional matrixes, finding the quickest path to a destination module becomes important. In a two-dimensional array, directions can be added to the data packets so that it knows not only the final destination but also a particular path to travel. For example, Value 000 could mean "stop," 010 could mean up, 011 could mean down and 100 could mean left, etc. Such directions could be relative to the data packet's direction of travel or could be absolute compared to the overall matrix orientation. The shortest path can be calculated using optimization algorithms and then transferred to the data packet. In the case of larger and larger matrixes, the larger address identifying designators may be used.

An electromagnetic connection and communications method for modular self-structuring system 400 of the present invention will now be discussed with reference to FIGS. 10-17. FIG. 10 depicts a first cell 500 and a second cell 500' to be connected in accordance with the method of the present invention. First cell 500 includes connecting assembly 40, pivoting assembly 51, telescoping leg 30 having tubular members 70-72 and connecting plate 36 having an outside surface 506 and electromagnet inductors 510-512. As previously described with reference to FIG. 1, connecting plate 36 can rotate about an axis Z of leg 30, and leg 30 can pivot about axes X and Y relative to connection assembly 40. Second cell 500' similarly includes connecting assembly 40', pivoting assembly 51', telescoping leg 30' having tubular members 70'-72' and connecting plate 36' having an outside surface 506' and electromagnet inductors 510'-512'. Although three inductors 510-512, 510'-512' are shown in FIG. 10 for each cell 500, 500', it should be understood that any desired number of inductors may be utilized with the present invention.

As cells 500 and 500' are essentially the same, only cell 500 will be discussed in detail, with the understanding that cell 500' has corresponding structure. Generally, each of inductors 510-512 include respective electromagnetic field poles P that are perpendicular to outside surface 506 of connecting plate 36. However, when multiple inductors are utilized (as shown in FIG. 10), only the vector-wise average of field poles P need be perpendicular to surface 506.

Inductors 510-512 are utilized as transducers that radiate electromagnetic fields to detect one or more inductor(s) on other connecting plates. In general, any kind of element that can radiate some kind of signal can be utilized for this purpose. However, inductors are preferred over capacitive elements that may be too weak if they are not large enough or not in close enough proximity to one another, or light-based devices which are easily susceptible to interferences by dirt or debris.

Inductors 510-512 mounted beneath surface 506 can be utilized for both sending and receiving signals with mutual inductance couplings that are essentially the same as couplings used in transformers or isolators. Inductors 510-512 are capable of transmitting output signals from either a central processing unit 99 or other source (not shown). Output signals are used to control a modulated current that is sent to each inductor 510-512 and converted into an electromagnetic field. Likewise, inductors 510-512 are capable of receiving input signals in the form of current induced by the electromagnetic field of another inductor.

When an inductor is in a signal-sending mode, it operates as a transmitter of signals, which may include data or provide proximity information to inductors acting in a receiving mode; when it is in a signal-receiving mode it operates as both a receiver of data and a sensor for determining how far away a transmitter inductor is located. As such, the transmitter inductor acts like a beacon telling sensing inductors where it is. To engage and inter-contact connecting plates, such as connecting plates 36, 36', a minimum of three inductors per connecting plate is preferred.

Figure 12A:
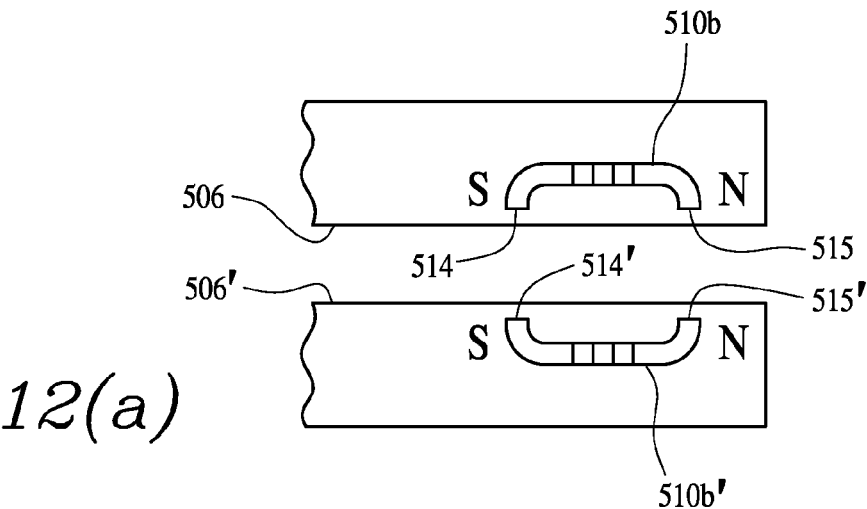
FIG. 12(a) depicts first and second connecting plates, wherein the connecting plates include respective horse-shoe inductor cores in alignment.
Figure 13A:
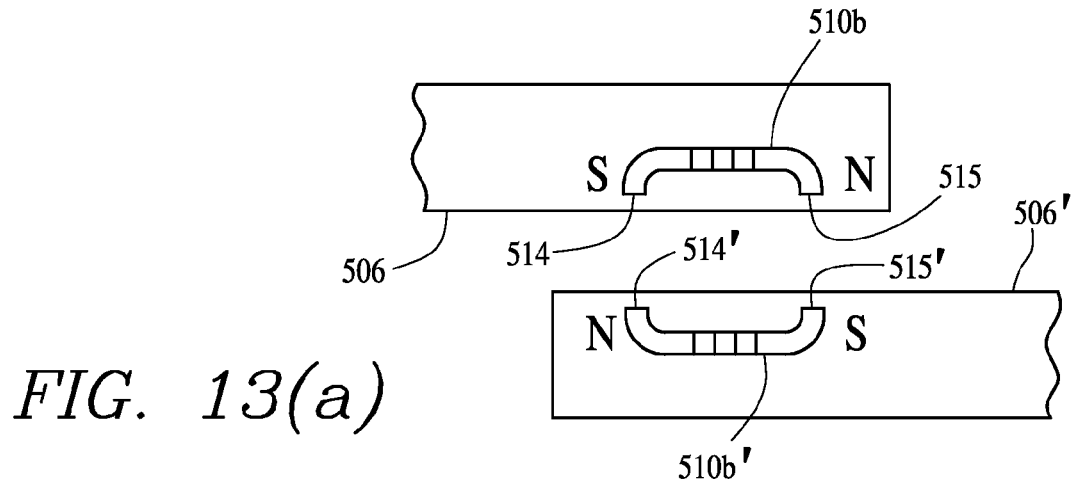
FIG. 13(a) depicts first and second connecting plates, wherein the connecting plates include respective horse-shoe inductor cores not in alignment.
Figure 13B:
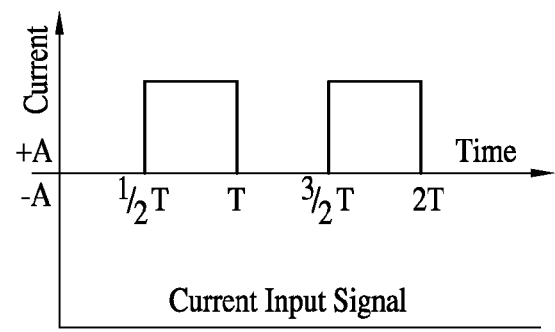
FIG. 13(b) is a graph of the current output signal of a horse-shoe inductor of FIG. 13(a)
Figure 13C:
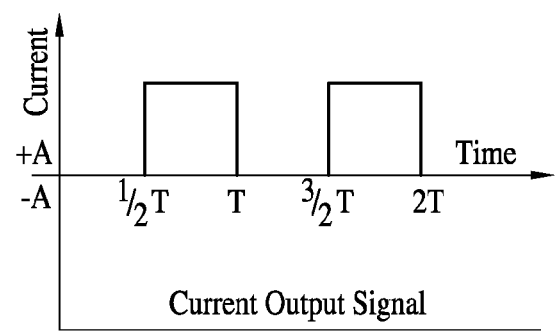
FIG. 13(c) is a graph of the current input signal of a horse-shoe inductor of FIG. 13(a)

Two types of ferromagnetic cores are contemplated for the inductors of the present invention. First cylinder shaped cores 510a and 510a' depicted in FIG. 11, while flattened horse-shoe cores 510b, 510b' are depicted in FIGS. 12(a) and 13(a). In general, cylinder shaped core 510a is parallel to the axis of connecting plate 36, while horse-shoe core 510b includes ends 514 and 515 that point in the direction of surface 506 of connecting plate 36. Similarly, cylinder shaped core 510a' is parallel to the axis of connecting plate 36' while horse-shoe core 510b' includes ends 514' and 515' that point in the direction of surface 506' of connecting plate 36'. In general, cylinder shaped core 510a is smaller and weighs less than horse-shoe core 510b, but horse-shoe core 510b is capable of transmitting stronger signals and includes more sensitive signal-receiving capabilities.

Figure 12B:
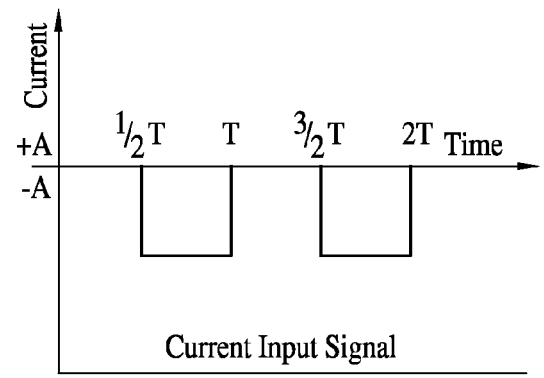
FIG. 12(b) is a graph of the current output signal of a horse-shoe inductor of FIG. 12(a)
Figure 12C:
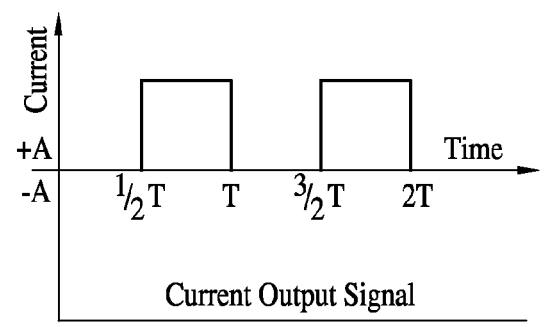
FIG. 12(c) is a graph of the current input signal of a horse-shoe inductor of FIG. 12(a)

The manner in which two connecting plates having horse-shoe cores communicate alignment information is outlined in FIGS. 12(a)-12(c). Connecting plates 36 and 36' utilize respective horse-shoe inductors 510b and 510b' in order to determine alignment of connecting plates 36, 36'. Inductor 510b receives an input signal pulse having a period T from inductor 510b'. When connecting plates 36, 36' are aligned, as shown in FIG. 12(a), input signal pulses received by inductor 510b have a negative current amplitude −A as compared to a positive current amplitude +A of output signal pulses. See FIGS. 12(b) and 12(c). When connecting plates 36, 36' are not in alignment, as depicted in FIG. 13(a), both input and output signal pulses received by inductor 510b have a positive current amplitude +A.

One drawback of utilizing horse-shoe inductors 510b, is that, when the electromagnetic N poles or the electromagnetic S poles of inductors 510b, 510b' are aligned, but the connecting plate axes Z, Z' are not, the current amplitude may mirror the situation in FIG. 12(a). However, in a preferred embodiment, multiple inductors are present on connecting plates 36, 36' and the input and output signal pulses of multiple inductors will allow a processor to properly determine the relationship of plates 36, 36'. Preferably, controlling logic running on a processor associated with a set of inductors is capable of recognizing and handling problems associated with failed inductors.

A problem may arise when a third connecting plate is too close to two connecting plates that are trying to connect for signal pulses to be accurately interpreted. Each of the two connecting plates may sense the third plate instead of each other. One manner in which this problem is resolved is by including two sets of inductors in concentric patterns on a connecting plate, as demonstrated by the two sets of cylinder type core inductors shown in FIG. 11. Of course, it should be understood that horse-shoe type inductors may also be aligned in concentric patterns, but this may add excessive weight to an overall cell, depending on the application. Another way in which the close-proximity of connecting plates can be overcome, is to assign identifier values to the inductor signals, or change to different sensor signal-transmitting modes, such as only transmitting one inductor output pulse signal at a time, or using only one inductor and keeping the others turned off. If the controlling logic is fundamental and simple, it is preferably part of the firmware; if not the logic is provided by a modular mesh operating system or in software applications that interact with the processor.

Inductors can be arranged in any type of pattern, provided that they are not all aligned along the same line. Inductor arrangements are designed to optimize the system, depending on the parameters desired and the type of ferromagnetic core utilized. In the configuration shown in FIG. 10, for example, inductor 510 is at the top right of plate 36, inductor 511 is at the bottom left of plate 36 and inductor 512 is at the bottom right of plate 36. In this configuration, each inductor 510-512 transmits a value or position identifier that identifies the position of the inductor.

Figure 14A:
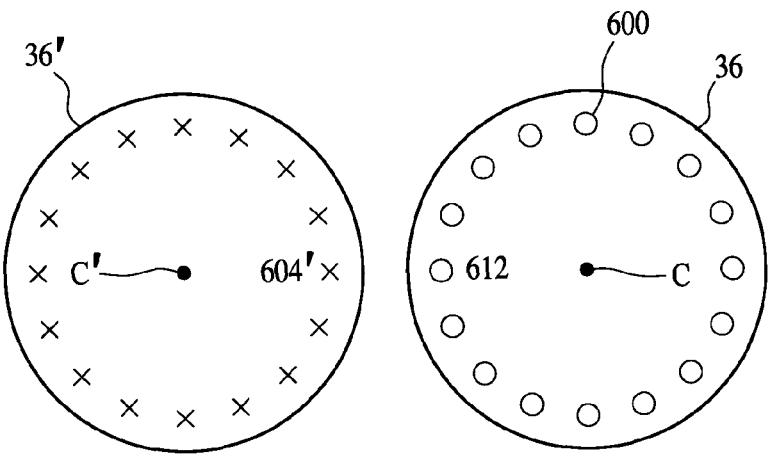
FIG. 14(a) depicts first and second connecting plates having one pair of inductors in close proximity.
Figure 14B:
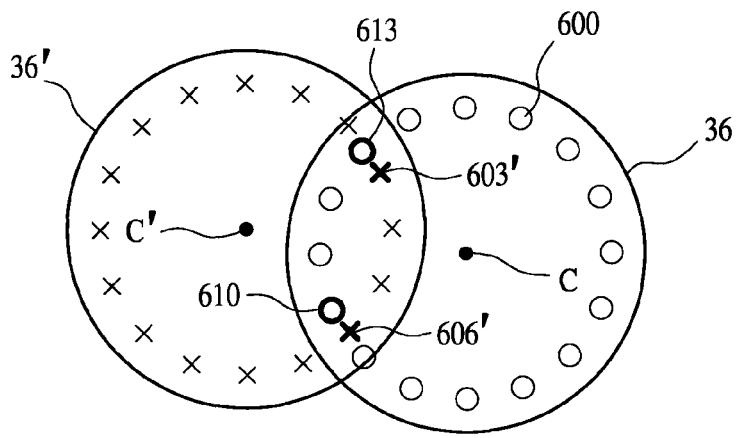
FIG. 14(b) depicts the connecting plates of FIG. 14(a), wherein two pairs of inductors are in close proximity.
Figure 14C:
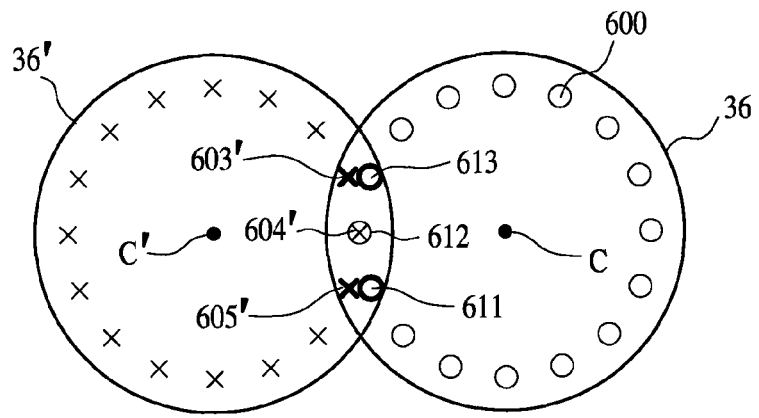
FIG. 14(c) depicts the connecting plates of FIG. 14(a), wherein two pairs of inductors are in close proximity and one pair is in alignment.

In a preferred embodiment shown in FIGS. 14(a)-14(c), each inductor 600 (not separately labeled) is placed equidistant from the center C of connecting plate 36 while each inductor 600' is placed equidistant from the center C' of connecting plate 36' in which case it is unnecessary for inductors 600, 600' to transmit a position identified. Each inductor 600 is equally spaced the same arc distance between each adjacent neighbor along the perimeter of a circular pattern centered around center C. Optionally, connecting plate 36 may include two sets of inductors each arranged on concentric perimeters and preferably aligned as pairs along radii of connecting plate 36, so that they can instantly and more easily determine orientations between connecting plates 36, 36'. See FIG. 11. Advantageously, having two sets of concentric inductors reduces the amount of computer processing required to determine the position of connecting plates 36, 36' relative to one another as compared to a single set of inductors.

The preferred manner in which connecting plates 36, 36' communicate with and connect to one another will now be discussed with reference to FIGS. 10, 14(a)-14(c) and 15. Cell 500 includes an 0-marker or first sensor 601 (shown in FIG. 10) that is fixed relative to the x and y-axes of telescoping leg 30. Sensor 601 is utilized to assign a position indicator or value of zero (0) to a first inductor 600 on connecting plate 36, and the remaining inductors 600 are assigned incrementing values from zero to fifteen (15) in a polar direction from connecting plate and leg axis Z. It is unnecessary for sensor 601 to be aligned with any of inductors 600. A second sensor 602 is utilized to determine whether the 0-valued inductor 600 is precisely aligned with the second sensor 602. The assigned values are utilized as beacon values and for determining when both cells 500, 500' are precisely aligned in a matrix 150 (depicted in FIG. 8). Other ways multiple connecting plates may be identified includes different signal-transmitting modes, such as having only one inductor transmit at a time (similar to light houses or electronic ring tokens), or by using only one inductor and keeping the others turned off.

Figure 15:
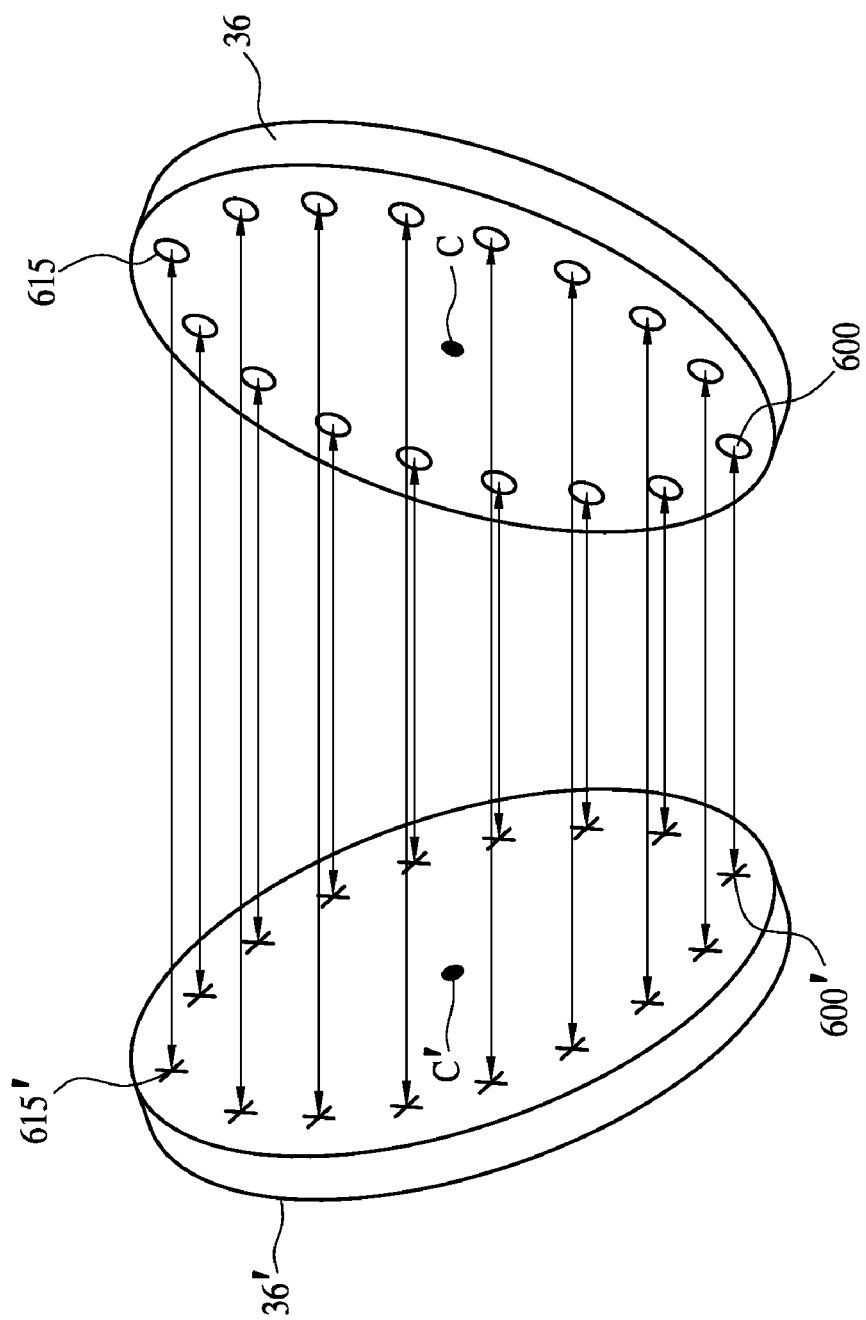
FIG. 15 depicts the connecting plates of FIG. 14(a), wherein the surfaces of the connecting plates are at an angle with respect to one another.

The present invention contemplates numerous possible spatial relationships between two connecting plates. FIG. 14(a) shows an approximation of a projected image of connecting plate 36 is in the same plane as connecting plate 36', and the closest inductors are labeled 612 and 604'. The proximity of inductors 612 and 604', in combination with the direction of their respective electromagnetic pole field vectors, effect the resulting current flow strengths induced between inductors 612 and 604'. In a second scenario depicted in FIG. 14(b), connecting plates 36 and 36' are oriented such that there are two pairs of inductors between them 613, 603' and 610, 606', each receiving strong signals. FIG. 14(c) depicts two connecting plates oriented in a planar relationship with one another having a pair of overlapping inductors 612, 604', a pair of close inductors 611, 605' and a pair of close inductors 613, 603'. FIG. 15 shows yet another scenario wherein inductors receive signals that vary more or less consistently between a strongest and weakest range, and the centers of connecting plates 36 and 36' lie approximately between the pairs of inductors receiving both the strongest 600, 600' and weakest 615, 615' signals.

If all inductors involved in a connecting event are receiving signals from one another, the various signals may be distinguished by using the different modes of signal operations as mentioned above, as well as utilizing different frequencies. In one example, one inductor at a time on each respective connecting plate emits a signal and the strengths of the signals are compared in order to determine which signal is strongest. Once two inductors (on respective connecting plates) having the strongest signals find one another, they can perform a "handshake" and switch to a different frequency to "lock" into each other. The remaining inductors on the respective connecting plates then repeat this process until all have "locked" into each other.

If all the inductor signals are approximately equal in strength, the connecting plates of respective cells will have aligned axes and by extending their respective legs, the cells can bring the connecting plates into contact and achieve an aligned mechanical contact (AMC). Of course, the physical limitations of the legs (extension, pivotal movement) may limit the connections available between respective cell units.

When there is only one strong signal sensed, as depicted in FIG. 14(a), the inductor will have an angle value a associated with it, which is calculated by the associated module's processor with the use of a 0-marker and leg pivot measurement readings. When there are two strong inductors, as depicted in FIG. 15(b), the second inductor will have an angle value β associated with it, which also gets calculated by the module's computer with the use of the 0-marker and leg pivot measurement readings. The labeling of inductors can be achieved with the use of the values assigned to each inductor by the 0-marker system to make a the inductor with the smaller value and β the inductor with the larger value.

Once two cells have completed the process of achieving AMC, it can then stay that way, or can form a bond between connecting plates. One way such a bond can be formed is by turning on a separate set of electromagnetic connectors 130 to form a powered bond that quickly takes place. Another way is to mechanically engage the connecting plates, such as with hooks and plungers connectors 126, 127 or mechanical connecting pins 135. See FIGS. 6(a) and 6(b). Regardless, once in AMC, connecting plates can transmit and receive data or send power from one cell or module to another.

Figure 16:
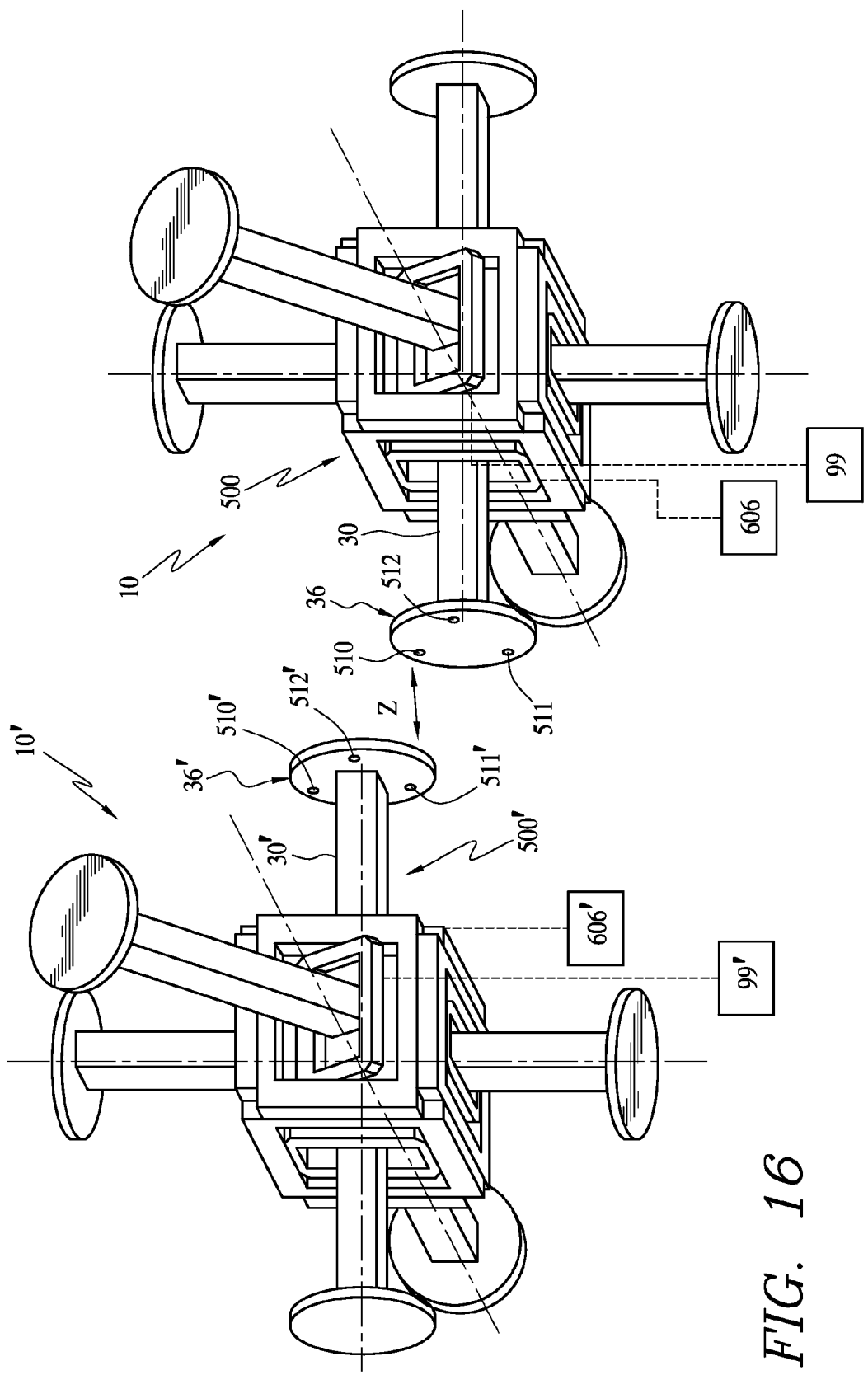
FIG. 16 depicts first and second modules aligning in accordance with the electromagnetic communication and connection system of the present invention.

As depicted in FIG. 16, first and second connecting plates 36, 36' are located within the general vicinity of one another. At this stage, there are five general steps that may be taken: 1) neither cell 500, 500' makes an attempt at AMC, 2) both cells 500, 500' make an attempt at AMC, 3) one cell 500 makes an attempt or request for AMC and is approved, 4) one cell 500 makes an attempt or request for AMC and is denied, and 5) both cells 500, 500' are under control of the same system and thus the system issues commands for an AMC.

In the case that one or both cells 500, 500' attempt to make contact under scenarios 2, 3 or 5 outlined above, a module 10 including cell 500 that initiates a connection event is designated the master, while module 10' including cell 500' is designated a slave. If one processing unit 99 is utilized for both modules 10, 10', processing unit 99 designates a master and a slave. The purpose of master and slave modes is to coordinate commands between two cells 500, 500' involved in an AMC, as needed. For example, a master module can issue a command to a slave module to stay where it is while the master module switches to another cell having a leg that is in a better position to pivot into range. Conversely, the slave module can send a signal indicating that it has reached its pivot limit and the system in control of the master can determine what action needs to be taken.

Figure 17:
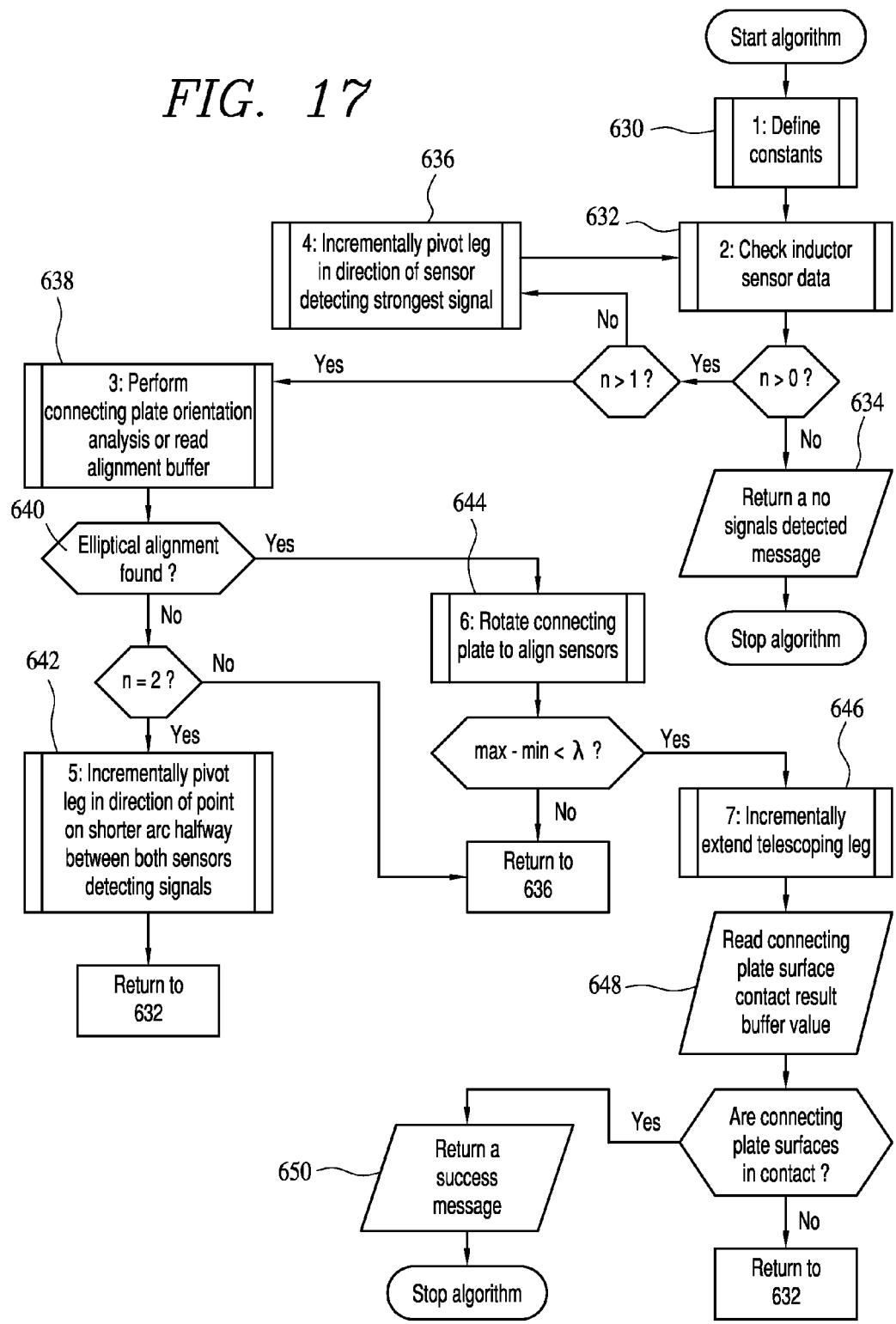
FIG. 17 depicts an algorithm for use with the electromagnetic communication and connection system of the present invention.

In describing a first algorithm utilized to connect first and second connecting plates 36, 36', FIGS. 16 and 17 will be referenced. In a first step 630 in FIG. 17, a set of constants is defined for modules 10, 10' associated with a connection event. Constants include: the arc limit value A, B that a leg can pivot about both the X and Y axes; the linear extending limit L of a telescoping leg; the radius R of the circular perimeter of inductors, or the concentric circle halfway between the two concentric perimeters formed if there are two concentric perimeters; the number of inductors C, or pairs of inductors in the case of two concentric sets; and the upper limit threshold λ or maximum distance two legs attempting AMC can be from parallel (based on inductor signal strengths). The constants also include a tolerance limit δ for a discrepancy calculation used to determine whether or not it is necessary to reverse the rotational direction of a connecting plate in order to align inductors based on average negative inductors strength readings between previous and current increments. If appropriate, processors 99, 99' may make adjustments to the constants at this time.

Assuming module 10 is designated as master and module 10' is designated as slave, in step 632, processor 99 checks inductor sensor data from inductors 510-512 for the presence of other connecting plates. In general, the number (n) of inductors that detect a transmitted signal is determined along with the minimum (min) and maximum (max) signal strength values. The signal strength values are utilized to determine if the connecting plate axes of each module attempting AMC are parallel. Buffer values are retrieved by an array index value. The "strength" array is size C and hold digitized values that are "ratio-normalized" to be values between 0 and 1 by being divided by a number that is at least as large as the strongest value, which occurs after all the analog-to-digital conversions of the received signal strengths have taken place. The "valid array" is used to eliminate sensor readings; for example, there might be faulty inductors or readings that are calculated to be implausible as result of environmental effects. If no connecting plates are detected, then a no-signal message is returned to processor 99 at step 634. If only one inductor, such as inductor 510, detects a strong signal N from an inductor on another module, such as inductor 512' as shown in FIG. 16, then an attempt will be made to pivot leg 30 an angle θ in a direction of the sensed inductor 512' at step 636.

Once more than one inductor signal is detected, a connecting plate orientation analysis is conducted at step 638 in order to determine if plates 36 and 36' are elliptically aligned. In general, this step utilizes information provided by a pattern of incrementing numbers from inductors that are acting as beacons. Values of two adjacent inductors are compared to determine the orientation of plates with respect to one another. More specifically, connecting plate inductors transmit sequential unit-incrementing digital values in consistent polar directions (clockwise or counter-clockwise) to produce a cross product-like direction, which can be utilized to determine orientation.

At step 640, if two inductors, such as inductors 510 and 511, detect signals from one or more inductors on another cell, such as 510'-512', and connecting plate 36 is determined not to be elliptically aligned with connecting plate 36', then an attempt to pivot leg 30 at an angle θ in the direction halfway between inductors 510 and 511 is made at step 642. Upon successfully completing step 642, the algorithm returns to step 632, where processor 99 checks inductor sensor data. If there is an elliptical alignment of plates 36, 36', connecting plate 36 is rotated to align inductors 510-512 with inductors 510'-512' at step 644. If the axes of legs 30 and 30' that are attempting an AMC are not parallel, then the algorithm will return to step 636. If the axes of legs 30 and 30' are close enough to be parallel, then it will extend the telescoping leg 30 an increment τ set by processor 99 at step 646. If they are not close enough to be parallel, then the algorithm returns to step 636. Increment τ is preferably determined by the strength of inductor signals. After step 646, processor 99 determines whether plates 36 and 36' are in AMC at step 648. If AMC has been achieved, then the algorithm is ended at step 650; if AMC has not been achieved, then the algorithm returns to step 632.

As should be understood, an orientation analysis is conducted at step 638 in FIG. 17 when the algorithm is utilized to connect plates having only one set of inductors arranged along a circular perimeter. In contrast, when the algorithm outlined is utilized for connecting plates having two sets of inductors arranged along two concentric circular perimeters, the connecting plate orientation analysis need not be conducted as in step 636 of the first algorithm. Instead, a buffer value is read, which indicates the orientation between the two plates.

In order to utilize the algorithm of the present invention, both modules to be connected must be powered. In the case where one of the modules to be connected is not powered, inductors from the powered module may provide some energy for the un-powered module to reflect a ping, similar to the type of communication utilized by non-powered radio frequency identification technology.

Although described with reference to preferred embodiments of the invention, it should be readily understood that various changes and/or modifications can be made to the invention without departing from the spirit thereof. For example, although the above-described algorithms detail a preferred manner in which modular units of the present invention are connected to one another, it should be understood that it is not necessary to implement any or all steps in the first or second algorithm in order to utilize the present invention. In general, the invention is only intended to be limited by the scope of the following claims.

I claim:

1. An electromagnetic communication and connection system for a self structuring and computing module having a housing, comprising:
   a power supply unit;
   a drive motor connected to the power supply unit;
   a leg having a first end and a second end, the first end being pivotably attached to the housing;
   a connecting plate attached to the second end of the leg and including a first inductor adapted to send and receive signals from additional modular units; and
   a processor in communication with said drive motor and first inductor.

2. The electromagnetic communication and connection system of claim 1, wherein the first inductor includes a horseshoe shaped core.

3. The electromagnetic communication and connection system of claim 1, wherein the first inductor includes a cylinder type core.

4. The electromagnetic communication and connection system of claim 1, further comprising a second and a third inductor located on the connecting plate.

5. The electromagnetic communication and connection system of claim 1, wherein the first inductor is one of a plurality of inductors spaced equidistant about a first concentric perimeter of the connecting plate.

6. The electromagnetic communication and connection system of claim 5, further comprising a position sensor adapted to assign a position value to each of the plurality of inductors.

7. The electromagnetic communication and connection system of claim 5, further comprising an alignment sensor adapted to determine whether one of the plurality of inductors is aligned with an inductor located on one of the additional modular units.

8. The electromagnetic communication and connection system of claim 1, wherein the leg is a telescoping leg.

9. The electromagnetic communication and connection system of claim 1, wherein the connecting plate further includes at least one connector adapted to mechanically connect the connecting plate to a connecting plate of another self structuring and computing module.

10. An electromagnetic communication and connection method for connecting first and second modular units, each of the first and second modular units including: a central housing; a power source; a drive motor connected to the power source; a leg having a first end and a second end, the first end being pivotably attached to the housing; a connecting plate attached to the second end of the leg including a first inductor adapted to send and receive signals; a processor in communication with the drive motor and said first inductor, the method comprising the steps of:
   sensing that the first inductor on the first modular unit is receiving a signal from the first inductor of the second modular unit;
   pivoting the leg of the first modular unit in the direction of the first inductor of the first modular unit;
   aligning the connecting plate of the first modular unit with the connecting plate of the second modular unit;
   rotating the connecting plate of the first modular unit to align its first inductor with the first inductor of the second modular unit; and
   extending the leg of the first modular unit until the connecting plate of the first modular unit is in contact with the connecting plate of the second modular unit.

11. The electromagnetic communication and connection method of claim 10, wherein the step of aligning utilizes a connecting plate orientation analysis to determine whether there is alignment of the connecting plate of the first modular unit and the connecting plate of the second modular unit.

12. The electromagnetic communication and connection method of claim 10, wherein each of the first and second modular units include a connector, and the method further comprises the step of mechanically connecting the first and second modular units via the connectors.

13. The electromagnetic communication and connection method of claim 10, wherein each of the respective connecting plates of the first and second modular units include a means for transferring power, and the method further comprises the step of transferring power between the first and second modular units via the means for transferring power.

14. The electromagnetic communication and connection method of claim 10, further comprising the step of designating the first module as master and designating the second module as slave.

15. The electromagnetic communication and connection method of claim 10, wherein one of the first and second modular units includes at least one additional leg having a first end and a second end the first end being pivotably attached to the housing and a connecting plate attached to the second end of the leg including a first inductor adapted to send and receive signals; and a third modular unit including a central housing, a power source, a drive motor connected to the power source, a leg having a first end and a second end, the first end being pivotably attached to the housing; a connecting plate attached to the second end of the leg including a first inductor adapted to send and receive signals and a processor in communication with the drive motor and said first inductor; the method including the additional steps of:

sensing that the first inductor on the additional leg unit is receiving a signal from the first inductor of the third modular unit;
pivoting the additional leg in the direction of the first inductor of the third modular unit;
aligning the connecting plate of the additional leg with the connecting plate of the third modular unit;
rotating the connecting plate of the additional leg to align its first inductor with the first inductor of the third modular unit: and
extending the additional leg until the connecting plate of the additional leg is in contact with the connecting plate of the third modular unit.

16. A matrix of modular units formed by an electromagnetic communication and connection method for connecting first and second modular units each of the first and second modular units including: a central housing; a power source; a drive motor connected to the power source; a leg having a first end and a second end, the first end being pivotably attached to the housing; a connecting plate attached to the second end of the leg including a first inductor adapted to send and receive signals; a processor in communication with the drive motor and said first inductor wherein one of the first and second modular units includes at least one additional leg having a first end and a second end, the first end being pivotably attached to the housing and a connecting plate attached to the second end of the leg including a first inductor adapted to send and receive signals; and a third modular unit including a central housing, a power source, a drive motor connected to the power source, a leg having a first end and a second end, the first end being pivotably attached to the housing; a connecting plate attached to the second end of the leg including a first inductor adapted to send and receive signals and a processor in communication with the drive motor and said first inductor the method comprising the steps of:
sensing that the first inductor on the first modular unit is receiving a signal from the first inductor of the second modular unit;
pivoting the leg of the first modular unit in the direction of the first inductor of the first modular unit;
aligning the connecting plate of the first modular unit with the connecting plate of the second modular unit:
rotating the connectin plate of the first modular unit to align its first inductor with the first inductor of the second modular unit: and
extending the leg of the first modular unit until the connecting plate of the first modular unit is in contact with the connecting plate of the second modular unit;
sensing that the first inductor on the additional leg unit is receiving a signal from the first inductor of the third modular unit;
pivoting the additional leg in the direction of the first inductor of the third modular unit;
aligning the connecting plate of the additional leg with the connecting plate of the third modular unit;
rotating the connecting plate of the additional leg to align its first inductor with the first inductor of the third modular unit; and
extending the additional leg until the connecting plate of the additional leg is in contact with the connecting plate of the third modular unit.

17. An electromagnetic communication and connection system for a self structuring and computing module having a housing, comprising:
a means for powering the module;
a leg having a first end and a second end, the first end being pivotally attached to the housing;
a means for connecting the leg to the leg of an additional modular unit including an inductor means adapted to send and receive signals from the additional modular unit; and
a processor in communication with said inductor means.

18. The electromagnetic communication and connection system for a self structuring and computing module of claim 17, further comprising a sensing means in communication with the inductor means.

* * * * *